US010020963B2

(12) United States Patent
Klomsdorf et al.

(10) Patent No.: US 10,020,963 B2
(45) Date of Patent: Jul. 10, 2018

(54) METHOD AND APPARATUS FOR SELECTIVELY TRANSMITTING DATA USING SPATIAL DIVERSITY

(71) Applicant: Google LLC, Mountain View, CA (US)

(72) Inventors: Armin W. Klomsdorf, Chicago, IL (US); William P. Alberth, Prairie Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 15/787,312

(22) Filed: Oct. 18, 2017

(65) Prior Publication Data

US 2018/0062882 A1 Mar. 1, 2018

Related U.S. Application Data

(63) Continuation of application No. 13/692,520, filed on Dec. 3, 2012, now Pat. No. 9,813,262.

(51) Int. Cl.
| | |
|---|---|
| H04L 27/00 | (2006.01) |
| H04L 25/02 | (2006.01) |
| H04B 7/0404 | (2017.01) |
| H04B 7/06 | (2006.01) |

(52) U.S. Cl.
CPC .......... H04L 25/02 (2013.01); H04B 7/0404 (2013.01); H04B 7/0689 (2013.01)

(58) Field of Classification Search
CPC ..... H04B 7/061; H04B 7/0689; H04L 1/0625; H04L 1/0003; H01Q 3/2605

USPC ........ 375/299, 267, 247, 260; 455/101, 436, 455/82; 370/210, 329
See application file for complete search history.

(56) References Cited

U.S. PATENT DOCUMENTS

| | | |
|---|---|---|
| 4,612,669 A | 9/1986 | Nossen |
| 4,631,543 A | 12/1986 | Brodeur |
| 4,754,285 A | 6/1988 | Robitaille |
| 4,881,123 A | 11/1989 | Chapple |
| 4,884,252 A | 11/1989 | Teodoridis et al. |
| 4,953,197 A | 8/1990 | Kaewell, Jr. et al. |
| 5,267,234 A | 11/1993 | Harrison |
| 5,459,440 A | 10/1995 | Claridge et al. |
| 5,469,307 A | 11/1995 | Yamada et al. |
| 5,564,086 A | 10/1996 | Cygan et al. |
| 5,634,200 A | 5/1997 | Kitakubo et al. |
| 5,699,319 A | 12/1997 | Skrivervik |

(Continued)

FOREIGN PATENT DOCUMENTS

| | | |
|---|---|---|
| CN | 1762137 | 4/2006 |
| CN | 1859656 | 11/2006 |

(Continued)

OTHER PUBLICATIONS

US 8,224,317, 08/2012, Knoppert et al. (withdrawn)

(Continued)

*Primary Examiner* — Fabricio R Murillo Garcia
(74) *Attorney, Agent, or Firm* — Colby Nipper

(57) ABSTRACT

A method, performed in a communication device having multiple transmitters, for selectively transmitting data using spatial diversity, that includes determining whether the data meets a data-type criterium, such as whether the data includes priority data, and transmitting the data using spatial diversity when the type of data meets the data type criterium.

20 Claims, 5 Drawing Sheets

(56) References Cited

U.S. PATENT DOCUMENTS

| | | |
|---|---|---|
| 5,757,326 A | 5/1998 | Koyama et al. |
| 5,804,944 A | 9/1998 | Alberkrack et al. |
| 5,862,458 A | 1/1999 | Ishii |
| 6,144,186 A | 11/2000 | Thadiwe et al. |
| 6,339,758 B1 | 1/2002 | Kanazawa et al. |
| 6,362,690 B1 | 3/2002 | Tichauer |
| 6,373,439 B1 | 4/2002 | Zurcher et al. |
| 6,400,702 B1 | 6/2002 | Meier |
| 6,560,444 B1 | 5/2003 | Imberg |
| 6,594,508 B1 | 7/2003 | Ketonen |
| 6,674,291 B1 | 6/2004 | Barber et al. |
| 6,879,942 B1 | 4/2005 | Nagase et al. |
| 6,927,555 B2 | 8/2005 | Johnson |
| 6,937,980 B2 | 8/2005 | Krasny et al. |
| 7,019,702 B2 | 3/2006 | Henriet et al. |
| 7,142,884 B2 | 11/2006 | Hagn |
| 7,199,754 B2 | 4/2007 | Krumm et al. |
| 7,202,734 B1 | 4/2007 | Raab |
| 7,202,815 B2 | 4/2007 | Swope et al. |
| 7,224,992 B2 | 5/2007 | Patino et al. |
| 7,254,420 B1 | 8/2007 | Klein |
| 7,260,366 B2 | 8/2007 | Lee et al. |
| 7,359,504 B1 | 4/2008 | Reuss et al. |
| 7,400,907 B2 | 7/2008 | Jin et al. |
| 7,433,661 B2 | 10/2008 | Kogiantis et al. |
| 7,436,896 B2 | 10/2008 | Hottinen et al. |
| 7,440,731 B2 | 10/2008 | Staudinger et al. |
| 7,471,963 B2 | 12/2008 | Kim et al. |
| 7,486,931 B2 | 2/2009 | Cho et al. |
| 7,504,833 B1 | 3/2009 | Sequine |
| 7,599,420 B2 | 10/2009 | Forenza et al. |
| 7,620,432 B2 | 11/2009 | Willins et al. |
| D606,958 S | 12/2009 | Knoppert et al. |
| 7,639,660 B2 | 12/2009 | Kim et al. |
| 7,643,642 B2 | 1/2010 | Patino et al. |
| 7,649,831 B2 | 1/2010 | Van Rensburg et al. |
| 7,664,200 B2 | 2/2010 | Ariyavisitakul et al. |
| 7,746,943 B2 | 6/2010 | Yamaura |
| 7,747,001 B2 | 6/2010 | Kellerman et al. |
| 7,760,681 B1 | 7/2010 | Chhabra |
| 7,773,535 B2 | 8/2010 | Vook et al. |
| 7,773,685 B2 | 8/2010 | Tirkkonen et al. |
| 7,813,696 B2 | 10/2010 | Kim |
| 7,822,140 B2 | 10/2010 | Catreux et al. |
| 7,835,711 B2 | 11/2010 | McFarland |
| 7,839,201 B2 | 11/2010 | Jacobson |
| 7,864,969 B1 | 1/2011 | Ma et al. |
| 7,885,211 B2 | 2/2011 | Shen et al. |
| 7,936,237 B2 | 5/2011 | Park et al. |
| 7,940,740 B2 | 5/2011 | Krishnamurthy et al. |
| 7,945,229 B2 | 5/2011 | Wilson et al. |
| 7,983,722 B2 | 7/2011 | Lowles et al. |
| 7,942,936 B2 | 9/2011 | Golden |
| 8,014,455 B2 | 9/2011 | Kim et al. |
| 8,072,285 B2 | 12/2011 | Spears et al. |
| 8,094,011 B2 | 1/2012 | Faris et al. |
| 8,095,081 B2 | 1/2012 | Vance |
| 8,098,120 B2 | 1/2012 | Steeneken et al. |
| 8,155,683 B2 | 4/2012 | Buckley et al. |
| 8,204,446 B2 | 6/2012 | Scheer et al. |
| 8,219,336 B2 | 7/2012 | Hoebel et al. |
| 8,219,337 B2 | 7/2012 | Hoebel et al. |
| 8,232,685 B2 | 7/2012 | Perper et al. |
| 8,233,851 B2 | 7/2012 | Jeon et al. |
| 8,259,431 B2 | 9/2012 | Katta |
| 8,275,327 B2 | 9/2012 | Yi et al. |
| 8,280,038 B2 | 10/2012 | Johnson et al. |
| 8,280,323 B2 | 10/2012 | Thompson |
| 8,284,849 B2 | 10/2012 | Lee et al. |
| 8,302,183 B2 | 10/2012 | Sood |
| 8,319,393 B2 | 11/2012 | DeReus |
| 8,373,596 B1 | 2/2013 | Kimball et al. |
| 8,374,633 B2 | 2/2013 | Frank et al. |
| 8,384,695 B2 | 2/2013 | Lee et al. |
| 8,428,022 B2 | 4/2013 | Frank et al. |
| 8,460,961 B2 | 6/2013 | Guo et al. |
| 8,483,707 B2 | 7/2013 | Krishnamurthy et al. |
| 8,509,338 B2 | 8/2013 | Sayana et al. |
| 8,542,776 B2 | 9/2013 | Kim et al. |
| 8,588,426 B2 | 11/2013 | Xin et al. |
| 8,594,584 B2 | 11/2013 | Greene et al. |
| 8,606,200 B2 | 12/2013 | Ripley et al. |
| 8,611,829 B2 | 12/2013 | Alberth et al. |
| 8,620,348 B2 | 12/2013 | Shrivastava et al. |
| 8,626,083 B2 | 1/2014 | Greene et al. |
| 8,712,340 B2 | 4/2014 | Hoirup |
| 8,712,355 B2 | 4/2014 | Black et al. |
| 8,731,496 B2 | 5/2014 | Drogi et al. |
| 8,761,296 B2 | 6/2014 | Zhang et al. |
| 8,767,722 B2 | 7/2014 | Kamble et al. |
| 8,909,173 B2 | 12/2014 | Harmke |
| 8,989,747 B2 | 3/2015 | Padden et al. |
| 9,002,354 B2 | 4/2015 | Krishnamurthy et al. |
| 9,031,523 B2 | 5/2015 | Anderson |
| 9,197,255 B2 | 11/2015 | Pourkhaatoun et al. |
| 9,203,489 B2 | 12/2015 | Sayana et al. |
| 9,215,659 B2 | 12/2015 | Asrani et al. |
| 9,241,050 B1 | 1/2016 | Asrani et al. |
| 9,298,303 B2 | 3/2016 | Wagner et al. |
| 9,301,177 B2 | 3/2016 | Ballantyne et al. |
| 9,326,320 B2 | 4/2016 | Hong et al. |
| 9,344,837 B2 | 5/2016 | Russel et al. |
| 9,386,542 B2 | 7/2016 | Russell et al. |
| 9,401,750 B2 | 7/2016 | Sayana et al. |
| 9,413,409 B2 | 8/2016 | Black et al. |
| 9,478,847 B2 | 10/2016 | Russell et al. |
| 9,491,007 B2 | 11/2016 | Black et al. |
| 9,549,290 B2 | 1/2017 | Smith |
| 9,591,508 B2 | 3/2017 | Halasz et al. |
| 9,813,262 B2 | 11/2017 | Klomsdorf et al. |
| 9,979,531 B2 | 5/2018 | Schwent et al. |
| 2002/0037742 A1 | 3/2002 | Enderlein et al. |
| 2002/0057751 A1 | 5/2002 | Jagger et al. |
| 2002/0090974 A1 | 7/2002 | Hagn |
| 2002/0138254 A1 | 9/2002 | Isaka et al. |
| 2002/0149351 A1 | 10/2002 | Kanekawa et al. |
| 2002/0193130 A1 | 12/2002 | Yang et al. |
| 2003/0050018 A1 | 3/2003 | Weissman et al. |
| 2003/0143961 A1 | 7/2003 | Humphreys et al. |
| 2003/0161485 A1 | 8/2003 | Smith |
| 2003/0222819 A1 | 12/2003 | Karr et al. |
| 2004/0051583 A1 | 3/2004 | Hellberg |
| 2004/0052314 A1 | 3/2004 | Copeland |
| 2004/0052317 A1 | 3/2004 | Copeland |
| 2004/0057530 A1 | 3/2004 | Tarokh et al. |
| 2004/0063439 A1 | 4/2004 | Glazko et al. |
| 2004/0082356 A1 | 4/2004 | Walton et al. |
| 2004/0106428 A1 | 6/2004 | Shoji |
| 2004/0148333 A1 | 7/2004 | Manion et al. |
| 2004/0176125 A1 | 9/2004 | Lee |
| 2004/0178912 A1 | 9/2004 | Smith et al. |
| 2004/0192398 A1 | 9/2004 | Zhu |
| 2004/0198392 A1 | 10/2004 | Harvey et al. |
| 2004/0235433 A1 | 11/2004 | Hugl et al. |
| 2004/0240575 A1* | 12/2004 | Rainbolt ............... H04B 7/12 375/267 |
| 2004/0246048 A1 | 12/2004 | Leyonhjelm et al. |
| 2005/0037733 A1 | 2/2005 | Coleman et al. |
| 2005/0041018 A1 | 2/2005 | Philipp |
| 2005/0049864 A1 | 3/2005 | Kaltenmeier et al. |
| 2005/0075123 A1 | 4/2005 | Jin et al. |
| 2005/0085195 A1 | 4/2005 | Tong et al. |
| 2005/0124393 A1 | 6/2005 | Nuovo et al. |
| 2005/0134456 A1 | 6/2005 | Niu et al. |
| 2005/0135324 A1 | 6/2005 | Kim et al. |
| 2005/0136845 A1 | 6/2005 | Masuoka et al. |
| 2005/0208952 A1 | 9/2005 | Dietrich et al. |
| 2005/0227640 A1 | 10/2005 | Haque et al. |
| 2005/0250532 A1 | 11/2005 | Hwang et al. |
| 2006/0019677 A1 | 1/2006 | Teague et al. |
| 2006/0052131 A1 | 3/2006 | Ichihara |
| 2006/0067277 A1 | 3/2006 | Thomas et al. |
| 2006/0077952 A1 | 4/2006 | Kubsch et al. |
| 2006/0099940 A1 | 5/2006 | Pfleging et al. |

(56) References Cited

U.S. PATENT DOCUMENTS

| | | |
|---|---|---|
| 2006/0103635 A1 | 5/2006 | Park |
| 2006/0181453 A1 | 8/2006 | King et al. |
| 2006/0194593 A1 | 8/2006 | Drabeck et al. |
| 2006/0207806 A1 | 9/2006 | Philipp |
| 2006/0209754 A1 | 9/2006 | Ji et al. |
| 2006/0215618 A1 | 9/2006 | Soliman et al. |
| 2006/0240827 A1 | 10/2006 | Dunn |
| 2006/0245601 A1 | 11/2006 | Michaud et al. |
| 2006/0256887 A1 | 11/2006 | Kwon et al. |
| 2006/0280261 A1 | 12/2006 | Prikhodko et al. |
| 2006/0291393 A1 | 12/2006 | Teague et al. |
| 2006/0292990 A1 | 12/2006 | Karabinis et al. |
| 2007/0004344 A1 | 1/2007 | DeGroot et al. |
| 2007/0008108 A1 | 1/2007 | Schurig et al. |
| 2007/0026838 A1 | 2/2007 | Staudinger et al. |
| 2007/0042714 A1 | 2/2007 | Ayed |
| 2007/0049280 A1 | 3/2007 | Sambhwani et al. |
| 2007/0069735 A1 | 3/2007 | Graf et al. |
| 2007/0091004 A1 | 4/2007 | Puuri |
| 2007/0093281 A1 | 4/2007 | Park et al. |
| 2007/0133462 A1 | 6/2007 | Guey |
| 2007/0153743 A1 | 7/2007 | Mukkavilli et al. |
| 2007/0197180 A1 | 8/2007 | McKinzie et al. |
| 2007/0200766 A1 | 8/2007 | McKinzie et al. |
| 2007/0211657 A1 | 9/2007 | McBeath et al. |
| 2007/0211813 A1 | 9/2007 | Talwar et al. |
| 2007/0222629 A1 | 9/2007 | Yoneyama |
| 2007/0223422 A1 | 9/2007 | Kim et al. |
| 2007/0232370 A1 | 10/2007 | Kim |
| 2007/0238425 A1 | 10/2007 | McFarland |
| 2007/0238496 A1 | 10/2007 | Chung et al. |
| 2007/0243894 A1 | 10/2007 | Das et al. |
| 2007/0255558 A1 | 11/2007 | Yasunaga et al. |
| 2007/0280160 A1 | 12/2007 | Kim et al. |
| 2007/0285326 A1 | 12/2007 | McKinzie |
| 2008/0001915 A1 | 1/2008 | Pihlaja et al. |
| 2008/0002735 A1 | 1/2008 | Poirier et al. |
| 2008/0014960 A1 | 1/2008 | Chou |
| 2008/0026710 A1 | 1/2008 | Buckley |
| 2008/0059188 A1 | 3/2008 | Konopka et al. |
| 2008/0080449 A1 | 4/2008 | Huang et al. |
| 2008/0089312 A1 | 4/2008 | Malladi |
| 2008/0095109 A1 | 4/2008 | Malladi et al. |
| 2008/0108310 A1 | 5/2008 | Tong et al. |
| 2008/0111714 A1 | 5/2008 | Kremin |
| 2008/0117886 A1 | 5/2008 | Kim |
| 2008/0130626 A1 | 6/2008 | Ventola et al. |
| 2008/0132247 A1 | 6/2008 | Anderson |
| 2008/0133462 A1 | 6/2008 | Aylward et al. |
| 2008/0157893 A1 | 7/2008 | Krah |
| 2008/0159239 A1 | 7/2008 | Odlyzko et al. |
| 2008/0165876 A1 | 7/2008 | Suh et al. |
| 2008/0167040 A1 | 7/2008 | Khandekar et al. |
| 2008/0167073 A1 | 7/2008 | Hobson et al. |
| 2008/0170602 A1 | 7/2008 | Guey |
| 2008/0170608 A1 | 7/2008 | Guey |
| 2008/0186105 A1 | 8/2008 | Scuderi et al. |
| 2008/0192683 A1 | 8/2008 | Han et al. |
| 2008/0212520 A1 | 9/2008 | Chen et al. |
| 2008/0225693 A1 | 9/2008 | Zhang et al. |
| 2008/0227414 A1 | 9/2008 | Karmi et al. |
| 2008/0227481 A1 | 9/2008 | Naguib et al. |
| 2008/0232395 A1 | 9/2008 | Buckley et al. |
| 2008/0267310 A1 | 10/2008 | Khan et al. |
| 2008/0274753 A1 | 11/2008 | Attar et al. |
| 2008/0279300 A1 | 11/2008 | Walker et al. |
| 2008/0298482 A1 | 12/2008 | Rensburg et al. |
| 2008/0307427 A1 | 12/2008 | Pi et al. |
| 2008/0309633 A1 | 12/2008 | Hotelling et al. |
| 2008/0312918 A1 | 12/2008 | Kim |
| 2008/0313146 A1 | 12/2008 | Wong et al. |
| 2008/0317259 A1 | 12/2008 | Zhang et al. |
| 2009/0041151 A1 | 2/2009 | Khan et al. |
| 2009/0055170 A1 | 2/2009 | Nagahama |
| 2009/0059783 A1 | 3/2009 | Walker et al. |
| 2009/0061790 A1 | 3/2009 | Rofougaran |
| 2009/0061887 A1 | 3/2009 | Hart et al. |
| 2009/0067382 A1 | 3/2009 | Li et al. |
| 2009/0091551 A1 | 4/2009 | Hotelling et al. |
| 2009/0102294 A1 | 4/2009 | Hodges et al. |
| 2009/0121963 A1 | 5/2009 | Greene |
| 2009/0122758 A1 | 5/2009 | Smith et al. |
| 2009/0122884 A1 | 5/2009 | Vook et al. |
| 2009/0207836 A1* | 8/2009 | Kawasaki ............ H04B 7/0697 370/352 |
| 2009/0228598 A1 | 9/2009 | Stamoulis et al. |
| 2009/0238131 A1 | 9/2009 | Montojo et al. |
| 2009/0243631 A1 | 10/2009 | Kuang |
| 2009/0252077 A1 | 10/2009 | Khandekar et al. |
| 2009/0256644 A1 | 10/2009 | Knudsen |
| 2009/0258614 A1 | 10/2009 | Walker |
| 2009/0262699 A1 | 10/2009 | Wdngerter et al. |
| 2009/0264078 A1 | 10/2009 | Yun et al. |
| 2009/0268675 A1 | 10/2009 | Choi |
| 2009/0270103 A1 | 10/2009 | Pani et al. |
| 2009/0276210 A1* | 11/2009 | Goto ..................... G10L 19/008 704/211 |
| 2009/0285321 A1 | 11/2009 | Schulz et al. |
| 2009/0290544 A1 | 11/2009 | Yano et al. |
| 2009/0295226 A1 | 12/2009 | Hodges et al. |
| 2009/0298433 A1 | 12/2009 | Sorrells et al. |
| 2009/0307511 A1 | 12/2009 | Fiennes et al. |
| 2009/0323608 A1 | 12/2009 | Adachi et al. |
| 2010/0002657 A1 | 1/2010 | Teo et al. |
| 2010/0014690 A1 | 1/2010 | Wolff et al. |
| 2010/0023898 A1 | 1/2010 | Nomura et al. |
| 2010/0034238 A1 | 2/2010 | Bennett |
| 2010/0034312 A1 | 2/2010 | Muharemovic et al. |
| 2010/0035627 A1 | 2/2010 | Hou et al. |
| 2010/0046460 A1 | 2/2010 | Kwak et al. |
| 2010/0046650 A1 | 2/2010 | Jongren et al. |
| 2010/0046763 A1 | 2/2010 | Homma |
| 2010/0056166 A1 | 3/2010 | Tenny |
| 2010/0081487 A1 | 4/2010 | Chen et al. |
| 2010/0085010 A1 | 4/2010 | Suzuki et al. |
| 2010/0092007 A1 | 4/2010 | Sun |
| 2010/0103949 A1 | 4/2010 | Jung et al. |
| 2010/0106459 A1 | 4/2010 | Bakalov |
| 2010/0109796 A1 | 5/2010 | Park et al. |
| 2010/0118706 A1 | 5/2010 | Parkvall et al. |
| 2010/0118839 A1 | 5/2010 | Malladi et al. |
| 2010/0128894 A1 | 5/2010 | Petit et al. |
| 2010/0156728 A1 | 6/2010 | Alvey et al. |
| 2010/0157858 A1 | 6/2010 | Lee et al. |
| 2010/0157924 A1 | 6/2010 | Prasad et al. |
| 2010/0159833 A1 | 6/2010 | Lewis et al. |
| 2010/0161658 A1 | 6/2010 | Hamynen et al. |
| 2010/0165882 A1 | 7/2010 | Palanki et al. |
| 2010/0167743 A1 | 7/2010 | Palanki et al. |
| 2010/0172310 A1 | 7/2010 | Cheng et al. |
| 2010/0172311 A1 | 7/2010 | Agrawal et al. |
| 2010/0182903 A1 | 7/2010 | Palanki et al. |
| 2010/0189191 A1 | 7/2010 | Taoka et al. |
| 2010/0195566 A1 | 8/2010 | Krishnamurthy et al. |
| 2010/0208838 A1 | 8/2010 | Lee et al. |
| 2010/0217590 A1 | 8/2010 | Nemer et al. |
| 2010/0220801 A1 | 9/2010 | Lee et al. |
| 2010/0260154 A1 | 10/2010 | Frank et al. |
| 2010/0271330 A1 | 10/2010 | Philipp |
| 2010/0272094 A1 | 10/2010 | Byard et al. |
| 2010/0274516 A1 | 10/2010 | Hoebel et al. |
| 2010/0291918 A1 | 11/2010 | Suzuki et al. |
| 2010/0311437 A1 | 12/2010 | Palanki et al. |
| 2010/0317343 A1 | 12/2010 | Krishnamurthy |
| 2010/0322176 A1 | 12/2010 | Chen et al. |
| 2010/0323718 A1 | 12/2010 | Jen |
| 2011/0026722 A1 | 2/2011 | Jing et al. |
| 2011/0039583 A1 | 2/2011 | Frank et al. |
| 2011/0051834 A1 | 3/2011 | Lee et al. |
| 2011/0080969 A1 | 4/2011 | Jongren et al. |
| 2011/0083066 A1 | 4/2011 | Chung et al. |
| 2011/0085588 A1 | 4/2011 | Zhuang |
| 2011/0085610 A1 | 4/2011 | Zhuang et al. |
| 2011/0096739 A1 | 4/2011 | Heidari et al. |

(56) References Cited

U.S. PATENT DOCUMENTS

| | | |
|---|---|---|
| 2011/0096915 A1 | 4/2011 | Nemer |
| 2011/0103498 A1 | 5/2011 | Chen et al. |
| 2011/0105023 A1 | 5/2011 | Scheer |
| 2011/0116423 A1 | 5/2011 | Rousu et al. |
| 2011/0116436 A1 | 5/2011 | Bachu et al. |
| 2011/0117925 A1 | 5/2011 | Sampath et al. |
| 2011/0119005 A1 | 5/2011 | Majima et al. |
| 2011/0121836 A1 | 5/2011 | Kim et al. |
| 2011/0143770 A1 | 6/2011 | Charbit et al. |
| 2011/0143773 A1 | 6/2011 | Kangas et al. |
| 2011/0148625 A1 | 6/2011 | Velusamy |
| 2011/0148700 A1 | 6/2011 | Lasagabaster et al. |
| 2011/0149868 A1 | 6/2011 | Krishnamurthy et al. |
| 2011/0149903 A1 | 6/2011 | Krishnamurthy et al. |
| 2011/0157067 A1 | 6/2011 | Wagner et al. |
| 2011/0158200 A1 | 6/2011 | Bachu et al. |
| 2011/0176252 A1 | 7/2011 | DeReus |
| 2011/0189964 A1 | 8/2011 | Jeon et al. |
| 2011/0190016 A1 | 8/2011 | Hamabe et al. |
| 2011/0216840 A1 | 9/2011 | Lee et al. |
| 2011/0244884 A1 | 10/2011 | Kangas et al. |
| 2011/0249637 A1 | 10/2011 | Hammarwall et al. |
| 2011/0250852 A1 | 10/2011 | Greene |
| 2011/0263303 A1 | 10/2011 | Lowles et al. |
| 2011/0268101 A1 | 11/2011 | Wang |
| 2011/0274188 A1 | 11/2011 | Sayana et al. |
| 2011/0281532 A1 | 11/2011 | Shin et al. |
| 2011/0285603 A1 | 11/2011 | Skarp |
| 2011/0286349 A1 | 11/2011 | Tee et al. |
| 2011/0292844 A1 | 12/2011 | Kwun et al. |
| 2011/0319027 A1 | 12/2011 | Sayana |
| 2012/0002609 A1 | 1/2012 | Larsson et al. |
| 2012/0008510 A1 | 1/2012 | Cai et al. |
| 2012/0021769 A1 | 1/2012 | Lindoff et al. |
| 2012/0032646 A1 | 2/2012 | Lee |
| 2012/0039251 A1 | 2/2012 | Sayana |
| 2012/0050122 A1 | 3/2012 | Wu et al. |
| 2012/0052903 A1 | 3/2012 | Han et al. |
| 2012/0071195 A1 | 3/2012 | Chakraborty et al. |
| 2012/0076043 A1 | 3/2012 | Nishio et al. |
| 2012/0077538 A1 | 3/2012 | Yun |
| 2012/0106475 A1 | 5/2012 | Jung |
| 2012/0112851 A1 | 5/2012 | Manssen et al. |
| 2012/0120772 A1 | 5/2012 | Fujisawa |
| 2012/0120934 A1 | 5/2012 | Cho |
| 2012/0122478 A1 | 5/2012 | Siomina et al. |
| 2012/0128175 A1 | 5/2012 | Visser et al. |
| 2012/0158839 A1 | 6/2012 | Hassan et al. |
| 2012/0161927 A1 | 6/2012 | Pierfelice et al. |
| 2012/0162129 A1 | 6/2012 | Krah et al. |
| 2012/0170541 A1 | 7/2012 | Love et al. |
| 2012/0177089 A1 | 7/2012 | Pelletier et al. |
| 2012/0178370 A1 | 7/2012 | George |
| 2012/0182144 A1 | 7/2012 | Richardson et al. |
| 2012/0206556 A1 | 8/2012 | Yu et al. |
| 2012/0209603 A1 | 8/2012 | Jing |
| 2012/0214412 A1 | 8/2012 | Schlub et al. |
| 2012/0214421 A1 | 8/2012 | Hoirup et al. |
| 2012/0214549 A1 | 8/2012 | Philbin |
| 2012/0220243 A1 | 8/2012 | Mendolia |
| 2012/0224715 A1 | 9/2012 | Kikkeri |
| 2012/0295554 A1 | 11/2012 | Greene et al. |
| 2012/0295555 A1 | 11/2012 | Greene et al. |
| 2012/0302188 A1 | 11/2012 | Sahota et al. |
| 2012/0306716 A1 | 12/2012 | Satake et al. |
| 2012/0309388 A1 | 12/2012 | Moosavi et al. |
| 2012/0309413 A1 | 12/2012 | Grosman et al. |
| 2012/0316967 A1 | 12/2012 | Mgrdechian et al. |
| 2013/0013303 A1 | 1/2013 | Strömmer et al. |
| 2013/0030803 A1 | 1/2013 | Liao |
| 2013/0034241 A1 | 2/2013 | Pandey et al. |
| 2013/0039284 A1 | 2/2013 | Marinier et al. |
| 2013/0040578 A1 | 2/2013 | Khoshnevis et al. |
| 2013/0059600 A1 | 3/2013 | Elsom-Cook et al. |
| 2013/0078980 A1 | 3/2013 | Saito |
| 2013/0094484 A1 | 4/2013 | Kneckt et al. |
| 2013/0109314 A1 | 5/2013 | Kneckt et al. |
| 2013/0109334 A1 | 5/2013 | Kwon et al. |
| 2013/0142113 A1 | 6/2013 | Fong et al. |
| 2013/0150092 A1 | 6/2013 | Frank et al. |
| 2013/0178175 A1 | 7/2013 | Kato |
| 2013/0194154 A1 | 8/2013 | Ballarda et al. |
| 2013/0195283 A1 | 8/2013 | Larson et al. |
| 2013/0195296 A1 | 8/2013 | Merks |
| 2013/0225101 A1 | 8/2013 | Basaran et al. |
| 2013/0226324 A1 | 8/2013 | Hannuksela et al. |
| 2013/0231151 A1 | 9/2013 | Kneckt et al. |
| 2013/0286937 A1 | 10/2013 | Liu et al. |
| 2013/0300648 A1 | 11/2013 | Kim et al. |
| 2013/0307735 A1 | 11/2013 | Contreras et al. |
| 2013/0310102 A1 | 11/2013 | Chao et al. |
| 2013/0316687 A1 | 11/2013 | Subbaramoo et al. |
| 2013/0322375 A1 | 12/2013 | Chang et al. |
| 2013/0322562 A1 | 12/2013 | Zhang et al. |
| 2013/0322655 A1 | 12/2013 | Schuldt et al. |
| 2013/0325149 A1 | 12/2013 | Manssen et al. |
| 2014/0024321 A1 | 1/2014 | Zhu et al. |
| 2014/0044126 A1 | 2/2014 | Sabhanatarajan et al. |
| 2014/0045422 A1 | 2/2014 | Qi et al. |
| 2014/0068288 A1 | 3/2014 | Robinson et al. |
| 2014/0092830 A1 | 4/2014 | Chen et al. |
| 2014/0093091 A1 | 4/2014 | Dusan et al. |
| 2014/0177686 A1 | 6/2014 | Greene et al. |
| 2014/0185498 A1 | 7/2014 | Schwent et al. |
| 2014/0207983 A1 | 7/2014 | Jones et al. |
| 2014/0227981 A1 | 8/2014 | Pecen et al. |
| 2014/0273882 A1 | 9/2014 | Asrani et al. |
| 2014/0273886 A1 | 9/2014 | Black et al. |
| 2014/0313088 A1 | 10/2014 | Rozenblit et al. |
| 2014/0349593 A1 | 11/2014 | Danak et al. |
| 2014/0376652 A1 | 12/2014 | Sayana et al. |
| 2014/0379332 A1 | 12/2014 | Rodriguez et al. |
| 2015/0017978 A1 | 1/2015 | Hong et al. |
| 2015/0024786 A1 | 1/2015 | Asrani et al. |
| 2015/0031420 A1 | 1/2015 | Higaki et al. |
| 2015/0072632 A1 | 3/2015 | Pourkhaatoun et al. |
| 2015/0080047 A1 | 3/2015 | Russell et al. |
| 2015/0092954 A1 | 4/2015 | Coker et al. |
| 2015/0171919 A1 | 6/2015 | Ballantyne et al. |
| 2015/0181388 A1 | 6/2015 | Smith |
| 2015/0236828 A1 | 8/2015 | Park et al. |
| 2015/0245323 A1 | 8/2015 | You et al. |
| 2015/0280674 A1 | 10/2015 | Langer et al. |
| 2015/0280675 A1 | 10/2015 | Langer et al. |
| 2015/0280876 A1 | 10/2015 | You et al. |
| 2015/0312058 A1 | 10/2015 | Black et al. |
| 2015/0349410 A1 | 12/2015 | Russell et al. |
| 2015/0365065 A1 | 12/2015 | Higaki et al. |
| 2016/0014727 A1 | 1/2016 | Nimbalker |
| 2016/0036482 A1 | 2/2016 | Black et al. |
| 2016/0080053 A1 | 3/2016 | Sayana et al. |

FOREIGN PATENT DOCUMENTS

| | | |
|---|---|---|
| CN | 1984476 | 6/2007 |
| CN | 101035379 | 9/2007 |
| CN | 102638609 | 8/2012 |
| CN | 102664861 | 9/2012 |
| DE | 10053205 | 5/2002 |
| DE | 10118189 | 11/2002 |
| EP | 0695059 | 1/1996 |
| EP | 1158686 | 11/2001 |
| EP | 1298809 | 4/2003 |
| EP | 1357543 | 10/2003 |
| EP | 1511010 | 3/2005 |
| EP | 1753152 | 2/2007 |
| EP | 1443791 | 2/2009 |
| EP | 2487967 | 8/2012 |
| EP | 2255443 | 11/2012 |
| EP | 2557433 | 2/2013 |
| EP | 2568531 | 3/2013 |
| EP | 2590258 | 5/2013 |
| JP | H09247852 | 9/1997 |
| JP | 2000286924 | 10/2000 |

(56) References Cited

FOREIGN PATENT DOCUMENTS

| KR | 20050058333 | 6/2005 |
|---|---|---|
| RU | 2005113251 | 1/2006 |
| WO | WO-9306682 | 4/1993 |
| WO | WO-9416517 | 7/1994 |
| WO | WO-9600401 | 1/1996 |
| WO | WO-1999021389 | 4/1999 |
| WO | WO-1999050968 | 10/1999 |
| WO | WO-0111721 | 2/2001 |
| WO | WO-2003007508 | 1/2003 |
| WO | WO-03107327 | 12/2003 |
| WO | WO-2004021634 | 3/2004 |
| WO | WO-20040040800 | 5/2004 |
| WO | WO-2004084427 | 9/2004 |
| WO | WO-2004084447 | 9/2004 |
| WO | WO-2006039434 | 4/2006 |
| WO | WO-2006046192 | 5/2006 |
| WO | WO-2006130278 | 12/2006 |
| WO | WO-2007052115 | 5/2007 |
| WO | WO-2007080727 | 7/2007 |
| WO | WO-2008027705 | 3/2008 |
| WO | WO-2008033117 | 3/2008 |
| WO | WO-2008085107 | 7/2008 |
| WO | WO-2008085416 | 7/2008 |
| WO | WO-2008085720 | 7/2008 |
| WO | WO-2008112849 | 9/2008 |
| WO | WO-2008113210 | 9/2008 |
| WO | WO-2008137354 | 11/2008 |
| WO | WO-2008137607 | 11/2008 |
| WO | WO-2008156081 | 12/2008 |
| WO | WO-2009107090 | 9/2009 |
| WO | WO-2010080845 | 7/2010 |
| WO | WO-2010124244 | 10/2010 |
| WO | WO-2010138039 | 12/2010 |
| WO | WO-2012115649 | 8/2012 |
| WO | WO-2012149968 | 11/2012 |
| WO | WO-2012177939 | 12/2012 |
| WO | WO-2013131268 | 9/2013 |

OTHER PUBLICATIONS

"Final Office Action", U.S. Appl. No. 13/733,297, dated Dec. 28, 2017, 21 pages.
"Foreign Office Action", EP Application No. 14705002.5, dated Oct. 26, 2017, 6 pages.
"Foreign Office Action", CN Application No. 201380063161.9, dated Oct. 30, 2017, 17 pages.
"3rd Generation Partnership Project; Technical Specification Group Radio Access Network", 3GPP TR 36.814 V9.0.0 (Mar. 2010), Further Advancements for E-UTRA Physical Layer Aspects (Release 9), 104 pages.
"A feedback framework based on W2W1 for Rei. 10", 3GPP TSG RAN WG1 #61bis, R1-103664,, 19 pages.
"Addition of PRS Muting Configuration Information to LPPa", 3GPP TSG RAN3 #68, Montreal, Canada; Ericsson, R3-101526, 7 pages.
"Advisory Action", U.S. Appl. No. 12/650,699, dated Jan. 30, 2013, 3 pages.
"Advisory Action", U.S. Appl. No. 12/650,699, dated Sep. 25, 2014, 3 pages.
"Advisory Action", U.S. Appl. No. 13/692,520, dated Sep. 6, 2016, 3 pages.
"An-1432 The LM4935 Headset and Push-Button Detection Guide", Texas Instruments Incorporated—http://www.ti.com/lit/an/snaa024a.snaa024a.pdf, 8 pages.
"Best Companion' reporting for improved single-cell MU-MIMO pairing", 3GPP TSG RAN WG1 #56; Athens, Greece; Alcatei-Lucent, R1-090926, 5 pages.
"Change Request—Clarification of the CP length of empty OFDM symbols in PRS subframes", 3GPP TSG RAN WG1 #59bis, Jeju, Vaiencia, Spain, ST-Ericsson, Motorola, Qualcomm Inc, R1-100311;, 2 pages.

"Change Request 36.211—Introduction of L TE Positioning", 3GPP TSG RAN WG1 #59, Jeju, South Korea; Ericsson, R1-095027, 6 pages.
"Change Request 36.213 Clarification of POSCH and PRS in combination for L TE positioning", 3GPP TSG RAN WG1 #58bis, Miyazaki, Japan; Ericsson, et al., R1-094262;, 4 pages.
"Change Request 36.214—Introduction of LTE Positioning", 3GPP TSG RAN WG1 #59, Jeju, South Korea, Ericsson, et al., R1-094430, 4 pages.
"Companion Subset Based PMI/CQI Feedback for LTE-A MU-MIMO", 3GPP TSG RAN WG1 #60; San Francisco, USA, RIM; R1-101104, 8 pages.
"Comparison of PMI-based and SCF-based MU-MIMO", 3GPP TSG RAN1 #58; Shenzhen, China; R1-093421,, 5 pages.
"Corrected Notice of Allowance", U.S. Appl. No. 14/031,739, dated Jun. 8, 2016, 2 pages.
"Corrected Notice of Allowance", U.S. Appl. No. 14/339,476, dated Sep. 13, 2016, 2 pages.
"Corrected Notice of Allowance", U.S. Appl. No. 14/339,476, dated Sep. 30, 2016, 2 pages.
"Corrected Notice of Allowance", U.S. Appl. No. 13/721,771, dated Dec. 16, 2016, 2 pages.
"Corrected Notice of Allowance", U.S. Appl. No. 14/150,047, dated Dec. 16, 2016, 2 pages.
"Corrected Notice of Allowance", U.S. Appl. No. 13/721,771, dated Feb. 10, 2017, 2 pages.
"Coverage enhancement for RACH messages", 3GPP TSG-RAN WG1 Meeting #76, R1-140153, Alcatel-Lucent, Alcatel-Lucent Shanghai Bell, 5 pages.
"Coverage Improvement for PRACH", 3GPP TSG RAN WG1 Meeting #76—R1-140115, Intel Corporation, 9 pages.
"Development of two-stage feedback framework for Rel-10", 3GPP TSG RAN WG1 #60bis Meeting, R1-101859, Alcatel-Lucent Shanghai Bell, Alcatel-Lucent, 5 pages.
"Digital cellular telecommunications system (Phase 2+)", Location Services (LCS); Broadcast Network Assistance for Enhanced Observed Time Difference (E-OTD) and Global Positioning System (GPS) Positioning Methods (3GPP TS 04.35 version 8.3.0 Release 1999), Jan. 1, 2001, 37 pages.
"Discussions on UE positioning issues", 3GPP TSG-RAN WG1 #57 R1-091911, San Francisco, USA,, 12 pages.
"DL Codebook design for 8Tx preceding", 3GPP TSG RAN WG1 #60bis, R1-102380, LG Electronics, Beijing, China, 4 pages.
"Double codebook design principles", 3GPP TSG RAN WG1 #61bis, R1-103804, Nokia, Nokia Siemens Networks, Dresden, Germany, 9 pages.
"Earbud with Push-to-Talk Microphone", Motorola, Inc., model 53727, iDEN 2.5 mm 4-pole mono PTT headset NNTNN5006BP, Jan. 1, 2013, 10 pages.
"Evaluation of protocol architecture alternatives for positioning", 3GPP TSG-RAN WG2 #66bis R2-093855, Los Angeles, CA, USA, 4 pages.
"Ex Parte Quayle Action", U.S. Appl. No. 13/088,237, filed Dec. 19, 2012, 5 pages.
"Extended European Search Report", EP Application No. 12196328.4, dated Feb. 26, 2014, 7 pages.
"Extended European Search Report", EP Application No. 12196319.3, dated Feb. 27, 2014, 7 pages.
"Extensions to Rel-8 type CQI/PMI/RI feedback using double codebook structure", 3GPP TSG RAN WG1#59bis, R1-100251, Valencia, Spain,, 4 pages.
"Feedback Codebook Design and Performance Evaluation", 3GPP TSG RAN WG1 #61bis, R1-103970, LG Electronics, 6 pages.
"Feedback considerations for DL MIMO and CoMP", 3GPP TSG RAN WG1 #57bis; Los Angeles, USA; Qualcomm Europe; R1-092695, 6 pages.
"Final Improvement Proposal for PTT Support in HFP", Bluetooth SIG, Inc., revision V10r00 (PTTinHFP_FIPD), Jul. 20, 2010, 50 pages.
"Final Office Action", U.S. Appl. No. 14/052,903, dated Oct. 1, 2015, 10 pages.
"Final Office Action", U.S. Appl. No. 13/477,609, dated Jul. 31, 2015, 11 pages.

(56) References Cited

OTHER PUBLICATIONS

"Final Office Action", U.S. Appl. No. 12/573,456, dated Mar. 21, 2012, 12 pages.
"Final Office Action", U.S. Appl. No. 12/756,777, dated Nov. 1, 2013, 12 pages.
"Final Office Action", U.S. Appl. No. 13/873,557, dated Jul. 17, 2015, 13 pages.
"Final Office Action", U.S. Appl. No. 14/280,775, dated Dec. 9, 2015, 13 pages.
"Final Office Action", U.S. Appl. No. 14/150,047, dated Mar. 4, 2016, 14 pages.
"Final Office Action", U.S. Appl. No. 13/692,520, dated Apr. 2, 2015, 15 pages.
"Final Office Action", U.S. Appl. No. 14/330,317, dated Jun. 16, 2016, 15 pages.
"Final Office Action", U.S. Appl. No. 12/650,699, dated Nov. 13, 2012, 17 pages.
"Final Office Action", U.S. Appl. No. 12/899,211, dated Oct. 24, 2013, 17 pages.
"Final Office Action", U.S. Appl. No. 13/733,297, dated Jul. 18, 2016, 17 pages.
"Final Office Action", U.S. Appl. No. 12/407,783, dated Feb. 15, 2012, 18 pages.
"Final Office Action", U.S. Appl. No. 12/650,699, dated Jul. 16, 2014, 20 pages.
"Final Office Action", U.S. Appl. No. 13/733,297, dated Jul. 22, 2015, 20 pages.
"Final Office Action", U.S. Appl. No. 14/012,050, dated Jul. 6, 2015, 23 pages.
"Final Office Action", U.S. Appl. No. 13/692,520, dated May 26, 2016, 25 pages.
"Final Office Action", U.S. Appl. No. 12/650,699, dated Jul. 29, 2015, 26 pages.
"Final Office Action", U.S. Appl. No. 13/955,723, dated Jul. 28, 2017, 27 pages.
"Final Office Action", U.S. Appl. No. 13/955,723, dated Jun. 16, 2016, 31 pages.
"Final Office Action", U.S. Appl. No. 14/445,715, dated Jul. 8, 2016, 31 pages.
"Final Office Action", U.S. Appl. No. 13/721,771, dated Oct. 29, 2015, 8 pages.
"Foreign Office Action", KR Application No. 10-2011-7021719, dated Oct. 9, 2012, 10 pages.
"Foreign Office Action", JP Application No. 2013-125220, dated Apr. 8, 2014, 11 pages.
"Foreign Office Action", CN Application No. 201480013330.2, dated Jun. 2, 2016, 15 pages.
"Foreign Office Action", CN Application No. 201080025882.7, dated Feb. 8, 2014, 19 pages.
"Foreign Office Action", EP Application No. 13806026.4, dated Sep. 11, 2017, 6 pages.
"Foreign Office Action", JP Application No. 2012-503786, dated Apr. 2, 2013, 6 pages.
"Foreign Office Action", CN Application No. 201080011891.0, dated Oct. 8, 2013, 6 pages.
"Foreign Office Action", EP Application No. 14705002.5, dated Feb. 16, 2017, 7 pages.
"Further details on DL OTDOA", 3GPP TSG RAN WG1 #56bis, Seoul, South Korea—Ericsson, R1-091312,, 6 pages.
"Further Refinements of Feedback Framework", 3GPP TSG-RAN WG1 #60bis R1-101742; Ericsson, ST-Ericsson, 8 pages.
"IEEE 802.16m System Description Document [Draft]", IEEE 802.16 Broadband Wireless Access Working Group, Nokia, Feb. 7, 2009, 171 pages.
"Implicit feedback in support of downlink MU-MIMO Texas Instruments", 3GPP TSG RAN WG1 #58; Shenzhen, China, R1-093176, 4 pages.
"Improving the hearability of LTE Positioning Service", 3GPP TSG RAN WG1 #55bis; Alcatei-Lucent, R1-090053,, 5 pages.
"Innovator in Electronics, Technical Update, Filters & Modules PRM Alignment", Module Business Unit, 95 pages.
"International Preliminary Report on Patentability", Application No. PCT/US2015/033570, dated Jan. 26, 2017, 7 pages.
"International Preliminary Report on Patentability", Application No. PCT/US2013/042042, dated Mar. 10, 2015, 8 pages.
"International Search Report", Application No. PCT/US20013/071616, dated Mar. 5, 2014, 2 pages.
"International Search Report", Application No. PCT/US2010/041451, dated Oct. 25, 2010, 3 pages.
"International Search Report", Application No. PCT/US2011/044103, dated Oct. 24, 2011, 3 pages.
"International Search Report", Application No. PCT/US2010/036982, dated Nov. 22, 2010, 4 pages.
"International Search Report", Application No. PCT/US2014/014375, dated Apr. 7, 2014, 4 pages.
"International Search Report", Application No. PCT/US2010/030516, dated Oct. 8, 2010, 5 pages.
"International Search Report and the Written Opinion", Application No. PCT/US2014/045755, dated Oct. 23, 2014, 11 pages.
"International Search Report and the Written Opinion", Application No. PCT/US2014/045956, dated Oct. 31, 2014, 11 pages.
"International Search Report and the Written Opinion", Application No. PCT/US2014/056642, dated Dec. 9, 2014, 11 pages.
"International Search Report and the Written Opinion", Application No. PCT/US2014/060440, dated Feb. 5, 2015, 11 pages.
"International Search Report and the Written Opinion", Application No. PCT/US2015/031328, dated Aug. 12, 2015, 11 pages.
"International Search Report and the Written Opinion", Application No. PCT/US2013/071615, dated Mar. 5, 2014, 13 pages.
"International Search Report and the Written Opinion", Application No. PCT/US2013/040242, dated Oct. 4, 2013, 14 pages.
"International Search Report and the Written Opinion", Application No. PCT/US2013/077919, dated Apr. 24, 2014, 8 pages.
"International Search Report and the Written Opinion", Application No. PCT/US2014/047233, dated Jan. 22, 2015, 8 pages.
"International Search Report and the Written Opinion", Application No. PCT/US2014/070925, dated May 11, 2015, 9 pages.
"International Search Report and Written Opinion", Application No. PCT/US2014/018564, dated Jun. 18, 2014, 11 pages.
"International Search Report and Written Opinion", Application No. PCT/US2013/072718, dated Jun. 18, 2014, 12 pages.
"International Search Report and Written Opinion", Application No. PCT/US2015/027872, dated Jul. 15, 2015, 12 pages.
"International Search Report and Written Opinion", Application No. PCT/US2010/026579, dated Feb. 4, 2011, 13 pages.
"International Search Report and Written Opinion", Application No. PCT/US2011/034959, dated Aug. 16, 2011, 13 pages.
"International Search Report and Written Opinion", Application No. PCT/US2011/045209, dated Oct. 28, 2011, 14 pages.
"International Search Report and Written Opinion", Application No. PCT/US2015/033570, dated Oct. 19, 2015, 18 pages.
"International Search Report and Written Opinion", Application No. PCT/US2010/038257, dated Oct. 1, 2010, 9 pages.
"International Search Report and Written Opinion", Application No. PCT/US2010/034023, dated Dec. 1, 2010, 9 pages.
"International Search Report and Written Opinion", Application No. PCT/US2011/039214, dated Sep. 14, 2011, 9 pages.
"Introduction of L TE Positioning", 3GPP TSG RAN WG1 #58, Shenzhen, China, R1-093604; Draft CR 36.213, 3 pages.
"Introduction of L TE Positioning", 3GPP TSG RAN WG1 #59, Jeju, South Korea, Ericsson et al.; R1-094429 5 pages.
"Introduction of LTE Positioning,", 3GPP TSG-RAN WG1 Meeting #58, R1-093603, Shenzhen, China,, 5 pages.
"Introduction of LTE Positioning,", 3GPP TSG RAN WG1 #58, Shenzhen, China; Draft CR 36.214; R1-093605;, 6 pages.
"LS on 12 5. Assistance Information for OTDOA Positioning Support for L TE Rel-9", 3GPP TSG RAN WG1 Meeting #58; Shenzhen, China; R1-093729, 3 pages.
"LS on LTE measurement supporting Mobility", 3GPP TSG WG1 #48, Tdoc R1-071250; StLouis, USA, 2 pages.
"LTE Positioning Protocol (LPP)", 3GPP TS 36.355 V9.0.0 (Dec. 2009); 3rd Generation Partnership Project; Technical Specification

(56) References Cited

OTHER PUBLICATIONS

Group Radio Access Network; Evolved Universal Terrestrial Radio Access (E-UTRA); Release 9, 102 pages.
"Market & Motivation (MRD Section3) for Interoperability Testing of Neighbor Awareness Networking", WiFi Alliance Neighbor Awareness Networking Marketing Task Group, Version 0.14, Jan. 1, 2011 , 18 pages.
"Marketing Statement of Work Neighbor Awareness Networking", Version 1.17, Neighbor Awareness Networking Task Group, 18 pages.
"Method for Channel Quality Feedback in Wireless Communication Systems", U.S. Appl. No. 12/823,178, filed Jun. 25, 2010, 34 pages.
"Motorola SJYN0505A Stereo Push to Talk Headset for Nextel", Motorola Inc., iDEN 5-pole 2.5 mm Stereo Headset SJYN05058A, Jan. 1, 2010 , 2 pages.
"Non-Final Office Action", U.S. Appl. No. 12/813,221, dated Oct. 8, 2013 , 10 pages.
"Non-Final Office Action", U.S. Appl. No. 12/577,553, dated Feb. 4, 2014 , 10 pages.
"Non-Final Office Action", U.S. Appl. No. 12/577,553, dated Aug. 12, 2013 , 11 pages.
"Non-Final Office Action", U.S. Appl. No. 14/150,047, dated Jun. 29, 2015 , 11 pages.
"Non-Final Office Action", U.S. Appl. No. 14/280,775, dated Mar. 23, 2016 , 11 pages.
"Non-Final Office Action", U.S. Appl. No. 12/650,699, dated Jul. 19, 2012 , 12 pages.
"Non-Final Office Action", U.S. Appl. No. 12/899,211, dated Apr. 10, 2014 , 12 pages.
"Non-Final Office Action", U.S. Appl. No. 12/492,339, dated Aug. 19, 2011 , 13 pages.
"Non-Final Office Action", U.S. Appl. No. 12/407,783, dated Oct. 5, 2011 , 14 pages.
"Non-Final Office Action", U.S. Appl. No. 14/068,309, dated Oct. 2, 2015 , 14 pages.
"Non-Final Office Action", U.S. Appl. No. 14/330,317, dated Feb. 25, 2016 , 14 pages.
"Non-Final Office Action", U.S. Appl. No. 12/823,178, dated Aug. 23, 2012 , 15 pages.
"Non-Final Office Action", U.S. Appl. No. 13/692,520, dated Sep. 5, 2014 , 15 pages.
"Non-Final Office Action", U.S. Appl. No. 14/031,739, dated Aug. 18, 2015 , 16 pages.
"Non-Final Office Action", U.S. Appl. No. 13/759,089, dated Apr. 18, 2013 , 16 pages.
"Non-Final Office Action", U.S. Appl. No. 12/407,783, dated Sep. 9, 2013 , 16 pages.
"Non-Final Office Action", U.S. Appl. No. 13/945,968, dated Apr. 28, 2015 , 16 pages.
"Non-Final Office Action", U.S. Appl. No. 12/756,777, dated Apr. 19, 2013 , 17 pages.
"Non-Final Office Action", U.S. Appl. No. 12/899,211, dated May 22, 2013 , 17 pages.
"Non-Final Office Action", U.S. Appl. No. 13/692,520, dated Oct. 5, 2015, 17 pages.
"Non-Final Office Action", U.S. Appl. No. 13/733,297, dated Feb. 2, 2016 , 17 pages.
"Non-Final Office Action", U.S. Appl. No. 14/012,050, dated Feb. 10, 2015 , 18 pages.
"Non-Final Office Action", U.S. Appl. No. 13/733,297, dated Jun. 22, 2017, 19 pages.
"Non-Final Office Action", U.S. Appl. No. 12/650,699, dated Apr. 23, 2013 , 19 pages.
"Non-Final Office Action", U.S. Appl. No. 13/873,557, dated Mar. 11, 2015 , 19 pages.
"Non-Final Office Action", U.S. Appl. No. 12/480,289, dated Jun. 9, 2011 , 20 pages.
"Non-Final Office Action", U.S. Appl. No. 13/955,723, dated Dec. 17, 2015 , 21 pages.
"Non-Final Office Action", U.S. Appl. No. 12/542,374, dated Dec. 23, 2011 , 22 pages.
"Non-Final Office Action", U.S. Appl. No. 12/542,374, dated Aug. 7, 2013 , 22 pages.
"Non-Final Office Action", U.S. Appl. No. 13/733,297, dated Mar. 13, 2015 , 23 pages.
"Non-Final Office Action", U.S. Appl. No. 13/955,723, dated Jan. 23, 2017 , 23 pages.
"Non-Final Office Action", U.S. Appl. No. 12/542,374, dated Feb. 24, 2014 , 25 pages.
"Non-Final Office Action", U.S. Appl. No. 12/650,699, dated Dec. 16, 2013 , 26 pages.
"Non-Final Office Action", U.S. Appl. No. 14/445,715, dated Jan. 15, 2016 , 26 pages.
"Non-Final Office Action", U.S. Appl. No. 12/542,374, dated Aug. 31, 2012 , 27 pages.
"Non-Final Office Action", U.S. Appl. No. 12/650,699, dated Mar. 30, 2015 , 28 pages.
"Non-Final Office Action", U.S. Appl. No. 13/955,723, dated Jan. 13, 2017 , 30 pages.
"Non-Final Office Action", U.S. Appl. No. 14/445,715, dated Oct. 20, 2016 , 43 pages.
"Non-Final Office Action", U.S. Appl. No. 13/924,838, dated Nov. 28, 2014 , 6 pages.
"Non-Final Office Action", U.S. Appl. No. 13/721,771, dated May 20, 2015 , 6 pages.
"Non-Final Office Action", U.S. Appl. No. 12/577,553, dated Dec. 28, 2011 , 7 pages.
"Non-Final Office Action", U.S. Appl. No. 13/477,609, dated Dec. 3, 2014 , 7 pages.
"Non-Final Office Action", U.S. Appl. No. 14/052,903, dated Mar. 11, 2015 , 7 pages.
"Non-Final Office Action", U.S. Appl. No. 14/952,738, dated Jan. 11, 2016 , 7 pages.
"Non-Final Office Action", U.S. Appl. No. 13/692,520, dated Nov. 17, 2016 , 7 pages.
"Non-Final Office Action", U.S. Appl. No. 14/226,041, dated Jun. 5, 2015 , 8 pages.
"Non-Final Office Action", U.S. Appl. No. 14/280,775, 9 pages.
"Non-Final Office Action", U.S. Appl. No. 12/573,456, dated Nov. 18, 2011 , 9 pages.
"Non-Final Office Action", U.S. Appl. No. 12/973,467, dated Mar. 28, 2013 , 9 pages.
"Non-Final Office Action", U.S. Appl. No. 13/477,609, dated Dec. 14, 2015 , 9 pages.
"Non-Final Office Action", U.S. Appl. No. 14/339,476, dated Jan. 20, 2016 , 9 pages.
"Non-Final Office Action", U.S. Appl. No. 13/721,771, dated May 31, 2016 , 9 pages.
"Notice of Allowance", U.S. Appl. No. 14/488,709, dated Sep. 23, 2015 , 10 pages.
"Notice of Allowance", U.S. Appl. No. 13/873,557, dated Dec. 23, 2015 , 10 pages.
"Notice of Allowance", U.S. Appl. No. 14/339,476, dated Jul. 18, 2016 , 11 pages.
"Notice of Allowance", U.S. Appl. No. 14/012,050, dated Dec. 14, 2015 , 12 pages.
"Notice of Allowance", U.S. Appl. No. 13/692,520, dated Jun. 28, 2017, 22 pages.
"Notice of Allowance", U.S. Appl. No. 12/365,166, dated Aug. 25, 2010 , 4 pages.
"Notice of Allowance", U.S. Appl. No. 14/226,041, dated Dec. 31, 2015 , 5 pages.
"Notice of Allowance", U.S. Appl. No. 13/873,557, dated Apr. 11, 2016 , 5 pages.
"Notice of Allowance", U.S. Appl. No. 14/280,755, dated Jul. 15, 2016 , 5 pages.
"Notice of Allowance", U.S. Appl. No. 13/721,771, dated Oct. 26, 2016 , 5 pages.
"Notice of Allowance", U.S. Appl. No. 13/040,090, dated Mar. 8, 2012 , 6 pages.
"Notice of Allowance", U.S. Appl. No. 13/945,968, dated Sep. 16, 2015 , 6 pages.

(56) References Cited

OTHER PUBLICATIONS

"Notice of Allowance", U.S. Appl. No. 12/365,166, dated Apr. 16, 2010, 7 pages.
"Notice of Allowance", U.S. Appl. No. 13/924,838, dated Mar. 12, 2015, 7 pages.
"Notice of Allowance", U.S. Appl. No. 13/924,838, dated Jul. 8, 2015, 7 pages.
"Notice of Allowance", U.S. Appl. No. 14/031,739, dated Mar. 1, 2016, 7 pages.
"Notice of Allowance", U.S. Appl. No. 14/952,738, dated Mar. 28, 2016, 7 pages.
"Notice of Allowance", U.S. Appl. No. 13/188,419, dated May 22, 2013, 8 pages.
"Notice of Allowance", U.S. Appl. No. 13/088,237, dated Jun. 17, 2013, 8 pages.
"Notice of Allowance", U.S. Appl. No. 13/088,237, dated Jul. 11, 2013, 8 pages.
"Notice of Allowance", U.S. Appl. No. 12/650,699, dated Jan. 14, 2016, 8 pages.
"Notice of Allowance", U.S. Appl. No. 14/052,903, dated Feb. 1, 2016, 8 pages.
"Notice of Allowance", U.S. Appl. No. 14/150,047, dated Oct. 28, 2016, 8 pages.
"On Extensions to Rel-8 PMI Feedback", 3GPP TSG RAN WG1 #60, R1-101129, Motorola, San Francisco, USA,, 4 pages.
"On OTDOA in LTE", 3GPP TSG RAN WG1 #55bis, Ljubljana, Slovenia; R1-090353, 8 pages.
"On OTDOA method for L TE Positioning", 3GPP TSG RAN WG1 #56, Ericsson, R1-090918, Athens, Greece, 6 pages.
"On Serving Cell Muting for OTDOA Measurements", 3GPP TSG RAN1 #57, R1-092628—Los Angeles, CA, USA, 7 pages.
"On the need of PDCCH for SIB, RAR and Paging", 3GPP TSG-RAN WG1 #76—R1-140239, 4 pages.
"Performance evaluation of adaptive codebook as enhancement of 4 Tx feedback", 3GPP TSG RAN WG1#61bis, R1-103447, 6 pages.
"PHY Layer 1 1 4. Specification Impact of Positioning Improvements", 3GPP TSG RAN WG1 #56bis, Athens, Greece; Qualcomm Europe, R1-090852,, 3 pages.
"Physical Channels and Modulation (Release 8)", 3GPP TS 36.211 V8.6.0 (Mar. 2009) 3rd Generation Partnership Project; Technical Specification Group Radio Access 28 Network; Evolved Universal Terrestrial Radio Access (E-UTRA);, 83 pages.
"Physical Channels and Modulation (Release 9)", 3GPP TS 36.211 V9.0.0 (Dec. 2009); 3rd Generation Partnership Project; Technical Specification Group Radio Access Network; Evolved Universal Terrestrial Radio Access (E-UTRA); Release 9, 85 pages.
"Physical layer procedures", 3GPP TS 36.213 V9.0.1 (Dec. 2009); 3rd Generation Partnership Project; Technical Specification Group Radio Access Network; Evolved Universal Terrestrial Radio Access (E-UTRA); Release 9, 79 pages.
"Positioning Subframe Muting for OTDOA Measurements", 3GPP TSG RAN1 #58 R1-093406, Shenzhen, P. R. China, 9 pages.
"Positioning Support for L TE", 3GPP TSG RAN WG1 #42, Athens, Greece, RP-080995, 5 pages.
"Pre-Brief Appeal Conference Decision", U.S. Appl. No. 12/650,699, filed Apr. 9, 2013, 2 pages.
"Rationale for mandating simulation of 4Tx Widely-Spaced Cross-Polarized Antenna Configuration for LTE-Advanced MU-MIMO", 3GPP TSG-RAN WG1 Meeting #61bis, R1-104184, Dresden, Germany, 5 pages.
"Reference Signals for Low Interference Subframes in Downlink;", 3GPP TSG RAN WG1 Meeting #56bis; Seoul, South Korea; Ericsson; R1-091314, 8 pages.
"Restriction Requirement", U.S. Appl. No. 13/721,771, dated Mar. 16, 2015, 5 pages.
"Restriction Requirement", U.S. Appl. No. 14/031,739, dated Apr. 28, 2015, 7 pages.
"Signalling Support for PRS Muting in", 3GPP TSG RAN2 #70, Montreal, Canada; Ericsson, ST-Ericsson; R2-103102, 2 pages.

"Some Results on DL-MIMO Enhancements for LTE-A", 3GPP TSG WG1 #55bis, R1-090328, Motorola; Ljubjana, Slovenia, 5 pages.
"Sounding RS Control Signaling for Closed Loop Antenna Selection", 3GPP TSG RAN #51, R1-080017—Mitsubishi Electric, 8 pages.
"Specification Impact of Enhanced Filtering for Scalable UMTS", 3GPP TSG RAN WG1 Meeting #76, R1-140726, QUALCOMM Incorporated, 2 pages.
"Study on hearability of reference signals in LTE positioning support", 3GPP TSG RAN1 #56bisa—R1-091336, Seoul, South Korea, 8 pages.
"Supplemental Notice of Allowance", U.S. Appl. No. 14/031,739, dated Apr. 21, 2016, 2 pages.
"Supplemental Notice of Allowance", U.S. Appl. No. 14/952,738, dated Jun. 9, 2016, 4 pages.
"Supplemental Notice of Allowance", U.S. Appl. No. 14/488,709, dated Oct. 7, 2015, 8 pages.
"System Simulation Results for OTDOA", 3GPP TSG RAN WG4 #53, Jeju, South Korea, Ericsson, R4-094532;, 3 pages.
"Technical 1 34. Specification Group Radio Access Network; Evolved Universal Terrestrial Radio Access (E-UTRA);", 3GPP TS 36.211 v8.4.0 (Sep. 2008); 3rd Generation Partnership Project; Physical Channels and Modulation (Release 8), Jan. 1, 2008, 78 pages.
"Technical Specification Group Radio Access Network", 3GPP TS 25.305 V8.1.0 (Dec. 2008) 3rd Generation Partnership Project; Stage 2 functional specification of User Equipment (UE) positioning in UTRAN (Release 8), Jan. 1, 2008, 79 pages.
"Technical Specification Group Radio Access Network; Evolved Universal Terrestrial Radio Access (E-UTRA)", 3GPP TS 36.305 V0.2.0 (May 2009) 3rd generation Partnership Project; Stage 2 functional specification of User Equipment, (UE) positioning in E-UTRAN (Release 9);, Jan. 1, 2010, 52 pages.
"Text 1 3 0. proposal on Orthonogonal PRS transmissions in mixed CP deployments using MBSFN subframes", 3GPP TSG RAN WG1 #59, Jeju, South Korea, Motorola, R1-095003;, 4 pages.
"Text proposal on measurements", 3GPP TSG RAN2 #60bis, Tdoc R2-080420; Motorola, Sevilla, Spain, 9 pages.
"Two Component Feedback Design and Codebooks", 3GPP TSG RAN1 #61, R1-103328, Motorola, Montreal, Canada, 7 pages.
"Two-Level Codebook design for MU MIMO enhancement", 3GPP TSG RAN WG1 #60, R1-102904, Montreal, Canada, 8 pages.
"UTRAN SFN-SFN observed lime 11 difference measurement & 3GPP TS 25.311 IE 10.3.7.106 UE positioning OTDOA neighbour cell info' assistance data D fields", 3GPP TSG RAN WG4 (Radio) #20, New Jersey, USA; Tdoc R4-011408,, 4 pages.
"View on the feedback framework for Rei. 1 0", 3GPP TSG RAN WG1 #61, R1-103026, Samsung, Montreal, Canada, 15 pages.
"Views on Codebook Design for Downlink 8Tx MIMO", 3GPP TSG RAN WG1 #60. R1-101219, San Francisco, USA, 9 pages.
"Written Opinion", Application No. PCT/US2013/071616, Jun. 3, 2015, 9 pages.
Colin, Frank D. et al., "Restrictions on Autonomous Muting to Enable 1 58. Time Difference of Arrival Measurements", U.S. Appl. No. 61/295,678, filed Jan. 15, 2010, 26 pages.
Costas, John P. "A Study of a Class of Detection Waveforms Having Nearly Ideal Range-Doppler Ambiguity Properties", Fellow, IEEE; Proceedings of the IEEE, vol. 72, No. 8, 14 pages.
Guey, Jiann-Ching "Synchronization Signal Design for OFDM Based on Time-Frequency Hopping Patterns", Ericsson Research; North Carolina, USA;, Jan. 1, 2007, 6 pages.
Guo, Zhiyong "A Series-Shunt Symmetric Swtich Makes Transmit-Receive Antennas Reconfigurable in Multipath Channels", IEEE 3d Int'l Conf. on Digital Object Identifier, May 29, 2011, pp. 468-471.
Jafar, Syed A. et al., "On Optimality of Beamforming for Multiple Antenna Systems with Imperfect Feedback", Department of Electrical Engineering, Stanford University, CA, USA, Jan. 1, 2004, 7 pages.
Knoppert, Michiel S. et al., "Communication Device", U.S. Appl. No. 29/329,028, filed Dec. 8, 2008, 10 pages.
Knoppert, Michiel S. et al., "Indicator Shelf for Portable Electronic Device", U.S. Appl. No. 12/480,289, filed Jun. 8, 2009, 15 pages.

(56) References Cited

OTHER PUBLICATIONS

Krishnamurthy, Sandeep H. et al., "Interference Control, SINR Optimization and Signaling Enhancements to Improve the Performance of OTDOA Measurements", U.S. Appl. No. 12/813,221, filed Jun. 10, 2010, 20 pages.
Krishnamurthy, Sandeep H. et al., "Threshold Determination in TDOA-Based Positioning System", U.S. Appl. No. 12/712,191, filed Feb. 24, 2010, 19 pages.
Li, Kai et al., "A Subband Feedback Controlled Generalized Sidelobe Canceller in Frequency Domain with Multi-Channel Postfilter", 2nd International Workshop on Intelligent Systems and Applications (ISA), IEEE, May 22, 2010 , 4 pages.
MACCM Technology Solutions, "GaAs SP6T 2.5V High Power Switch Dual-/Tri-/Quad-Band GSM Applications", Rev. V1 data sheet, www.macomtech.com, Mar. 22, 2003 , 5 pages.
Renesas, "uPG2417T6M GaAs Integrated Circuit SP6T Switch for NFC Application (R09DS0010EJ0100)", Rev. 1.00 data sheet, Dec. 24, 2010 , 12 pages.
Sayana, Krishna K. et al., "Method of Codebook Design and Precoder Feedback in Wireless Communication Systems", U.S. Appl. No. 61/374,241, filed Aug. 16, 2010, 40 pages.
Sayana, Krishna K. et al., "Method of Precoder Information Feedback in Multi-Antenna Wireless Communication Systems", U.S. Appl. No. 61/331,818, filed May 5, 2010, 43 pages.
Tesoriero, R et al., "Improving Location Awareness in Indoor Spaces Using RFID Technology", ScienceDirect, Expert Systems with Applications, Jan. 1, 2010 , 894-898.
Valkonen, Risto "Impedance Matching and Tuning of Non-Resonant Mobile Terminal Antennas", Aalto University Doctorial Dissertations, Mar. 15, 2013 , 94 pages.
Visotsky, Eugene et al., "Space—Time Transmit PrecodingWith Imperfect Feedback", IEEE Transactions on Information Theory, vol. 47, No. 6, pp. 2632-2639.
Vodafone Group, "PDCCH Structure for MTC Enhanced Coverage", 3GPP TSG RAN WG1 #76, R1-141030, Prague, Czech Republic, 2 pages.
Yu-Chun, Wu et al., "A New Downlink Control Channel Scheme for LTE", Vehicular Technology Conference (VTC Spring), 2013 IEEE 77th, Jun. 2, 2013 , 6 pages.
Yun, Seok Y. et al., "Distributed Self-Pruning(DSP) Algorithm for Bridges in Clustered Ad Hoc Networks", Embedded Software and Systems; Lecture Notes in Computer Science, Springer, May 14, 2007 , pp. 699-707.
Zhuang, Xiangyang et al., "Method for Precoding Based on Antenna Grouping", U.S. Appl. No. 12/899,211, filed Oct. 6, 2010, 26 pages.
"Foreign Office Action", Chinese Application No. 201480019733.8, dated Mar. 27, 2018, 16 pages.
"Non-Final Office Action", U.S. Appl. No. 13/955,723, dated Mar. 29, 2018, 11 pages.
"Notice of Allowance", U.S. Appl. No. 13/733,297, dated Feb. 8, 2018, 11 pages.

\* cited by examiner

METHOD AND APPARATUS FOR SELECTIVELY TRANSMITTING DATA USING SPATIAL DIVERSITY

RELATED APPLICATION

This application is a continuation of and claims priority to U.S. patent application Ser. No. 13/692,520 filed Dec. 3, 2012 entitled "Method and Apparatus for Selectively Transmitting Data Using Spatial Diversity", the disclosure of which is incorporated by reference herein in its entirety.

FIELD OF THE DISCLOSURE

The present disclosure relates generally to communicating data using diversity transmissions and more particularly to selectively transmitting data using spatial diversity.

BACKGROUND

Next generation wireless systems make use of multiple transmitters and receivers (i.e., multiple antenna systems) in a mobile device and in a base station. Multiple antenna systems are also known as Multiple Input, Multiple Output (MIMO) systems. The availability of multiple transmitters and receivers provides for communicating data over multiple paths or streams in the uplink and downlink directions. For example, in a MIMO system, spatial diversity can be used to make data transmission more robust or reliable. More specifically, using spatial diversity, robustness or reliability is increased by transmitting the same data redundantly over the same channel using multiple antennas. In other words, the transmitting device creates multiple data streams of the same data and transmits the multiple streams over the same channel using different antennas.

Consequently, a recipient device (also referred to herein simply as a recipient) receives two or more copies of the same data. Because the recipient has two or more copies of the data, the recipient can correct errors that occurred in the original transmission without requesting a data retransmission, thereby increasing robustness. However, robustness comes at a cost of increased battery consumption when implementing spatial diversity since multiple transmitters are used to drive multiple antennas. Thus, if at all possible, transmissions using spatial diversity should be selectively performed.

Accordingly, there is a need for methods and apparatus for selectively transmitting data using spatial diversity.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
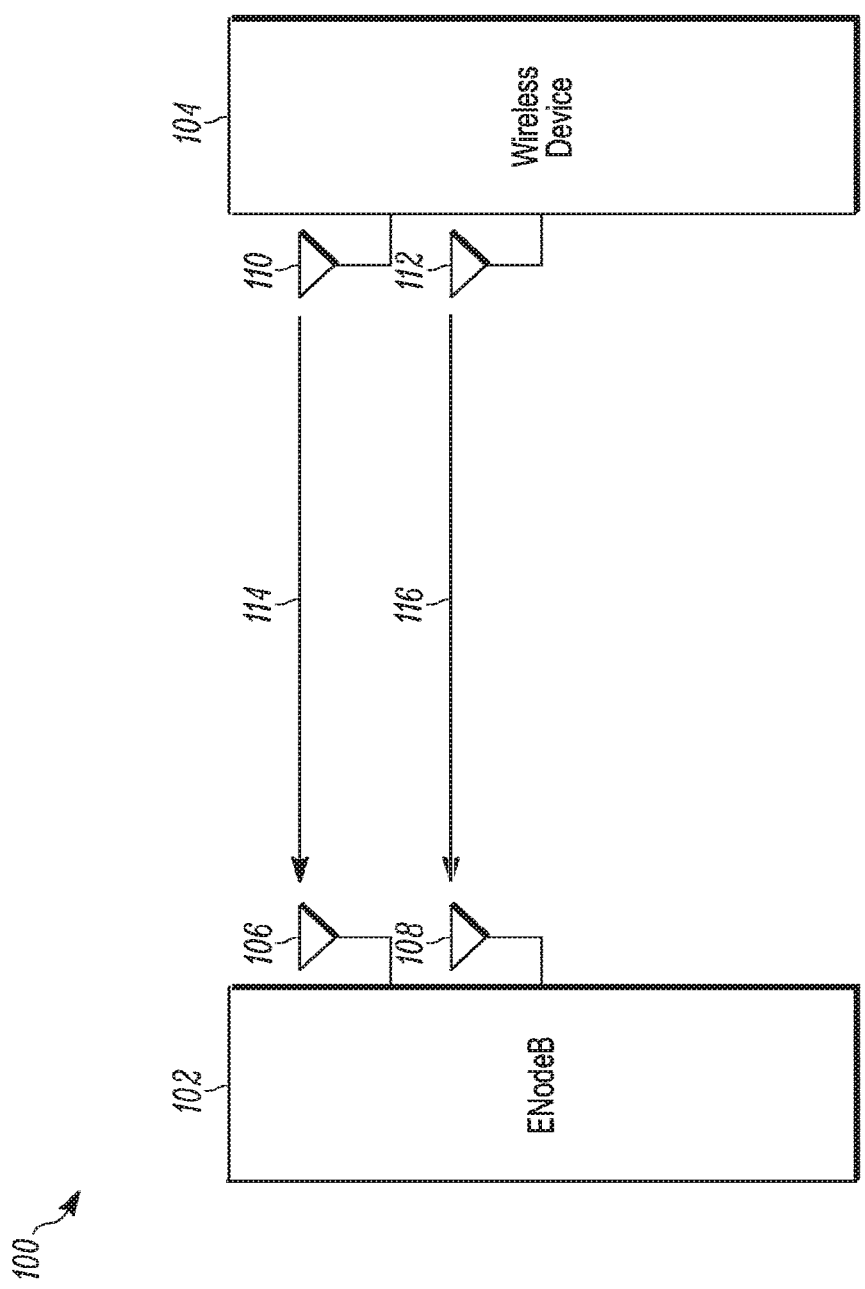
FIG. 1 is a block diagram illustrating one example of a next generation wireless network in which embodiments of the present teaching operate.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for selectively transmitting data using spatial diversity, wherein the type of data that is transmitted is a criteria for the spatial diversity transmissions. For example, spatial diversity is used during data transmissions when the data type is priority data such as priority control data or priority payload data, or when at least one diversity transmit criteria is met.

More particularly, in accordance with the teachings herein, a method performed in a communication device having multiple transmitters, for transmitting data using spatial diversity comprises: determining a type of data to be transmitted; determining whether the type of data meets a data type criteria, which comprises determining whether the data includes priority data; and transmitting the data using spatial diversity when the type of data meets the data type criteria.

Also in an accordance with teachings herein, an electronic device that selectively transmits data using spatial diversity comprises: at least two transmitters; a controller coupled to the at least two transmitters, wherein the controller is configured to determine a type of data to be transmitted, determine that the type of data is priority data, and, responsively, control the at least two transmitters to transmit the priority data using spatial diversity.

In accordance with still another embodiment a computer-readable storage element having computer readable code stored thereon for programming a computer to perform a method for selectively transmitting data using spatial diversity, the method comprising: determining whether to transmit the data using spatial diversity based on whether the data includes priority data; and transmitting the data using spatial diversity when it is determined that the data includes priority data. In accordance embodiments, the data is transmitted using spatial diversity when the data includes priority control data or priority payload data.

In another embodiment, the method further comprises determining whether to transmit the data using spatial diversity based on whether a diversity transmit criteria is met; and transmitting the data using spatial diversity upon determining that the diversity transmit criteria is met, which comprises determining that one of: an electronic device performing the transmitting is using a timing advance; output power at the electronic device exceeds a first threshold; a sensor indicates an impaired antenna element in the electronic device; a received signal strength indicator (RSSI) value is less than a second threshold; or a signal to noise ratio (SNR) value is less than a third threshold.

Figure 2:
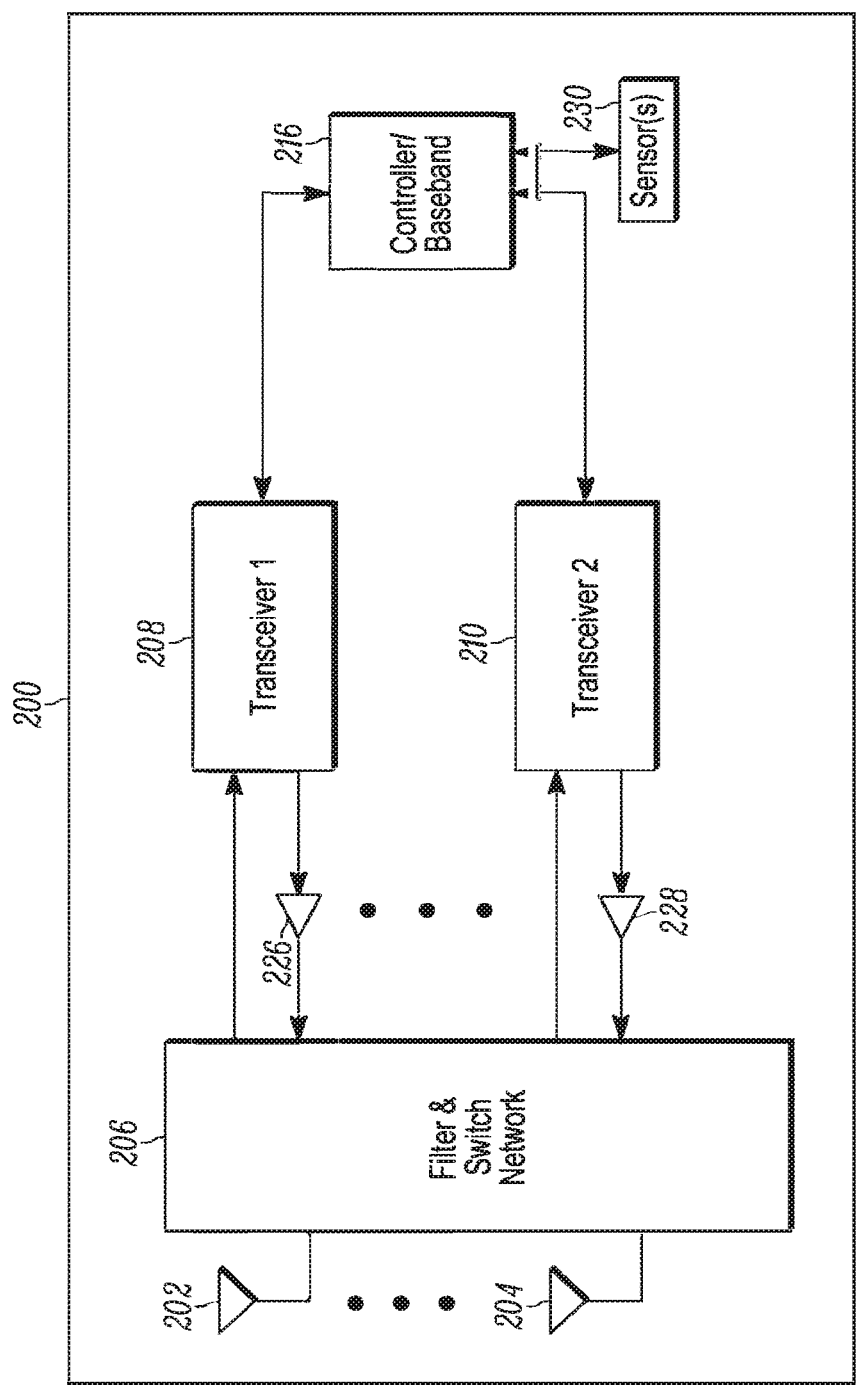
FIG. 2 is block diagram illustrating one example of an electronic device in which embodiments of the present teachings operate.

Referring now to the drawings, and in particular to FIG. 1, a next generation multiple antenna network or system 100 is shown, that is adapted in accordance with the present teachings as described herein. The system 100 includes infrastructure equipment comprising an infrastructure electronic device 102 and a wireless electronic device 104. In general, as used herein, devices such as 102 and 104, being "configured," "operative" or "adapted" means that such devices are implemented using one or more hardware devices such as memory devices, network interfaces such as transceivers, and/or processors that are operatively coupled, for example, as is shown in FIG. 2. The memory devices, network interfaces, and/or processors, when programmed (e.g., using software or firmware), form the means for these system elements to implement their desired functionality, for example, as illustrated by reference to the methods shown in FIGS. 3-5.

In an embodiment, network 100 is a 3rd Generation Partnership Project (3GPP) network, such as a Long Term Evolution (LTE) network 100, meaning that network infrastructure equipment, e.g., 102, and wireless devices, e.g., 104, operating within the system 100 operate in conformance with at least portions of one or more standards documents developed by 3GPP, such as one or more LTE standards documents developed by 3GPP. Although the system 100 is described as a 3GPP LTE system, the present teachings can be incorporated into other types of multiple antenna systems such as WiMax systems, Evolved High Speed Packet Access (HSPA+) systems, Wireless Local Area Network (WLAN) 802.11n systems, etc.

The system 100 network infrastructure equipment includes an Evolved Packet Core (EPC), which functions as the network core. The EPC is coupled to an Evolved Universal Terrestrial Radio Access Network (E-UTRAN), which serves as the access network for one or more wireless devices 104 that communicate using the system 100. The E-UTRAN includes one or more eNodeBs (eNBs) 102, which are the LTE equivalent of base stations. At least one eNB 102 includes multiple antenna elements (also referred to herein as antennas), e.g., 106 and 108 operatively coupled to multiple transmitters and/or multiple receivers.

In this embodiment, the electronic device 104 comprises a portable wireless communication device such as a radio telephone, a tablet computer, a personal digital assistant, a gaming console, a remote controller, an electronic book reader, or any other type of electronic device capable of interconnecting with a telecommunications network via the eNB 102. The communication device 104 is used to establish connections with the eNB 102 to communicate data. Data, as used herein, means any type of information that can be transferred or communicated between two or more devices operating in a communication system, such as the system 100. Accordingly, data includes information such as, by way of example, voice data, control data, video data, QoS data, etc. In this illustrated embodiment, the wireless device 104 includes multiple antenna elements, e.g., 110 and 112 operatively coupled to multiple transmitters and/or multiple receivers.

An expectation of networks such as LTE and other next generation networks is providing higher data rates and more reliable and robust data transmissions than predecessor networks. To this end, electronic devices (e.g., 102, 104) within some next generation wireless networks use the multiple antenna elements (e.g., 106, 108, 110, 112) to perform spatial diversity to communicate multiple redundant data streams between the electronic devices over the same channel within signals 114, 116. A channel is the logical representation of radio frequency (RF) resources carrying the data streams; and the channel is characterized by a transmit or receive frequency and a capacity, such as bandwidth in Hz or data rate in bits per second. In another example, the channel is referred to as a link, a Radio Frequency (RF) link, or a wireless communication path. A signal is a waveform (such as a radio wave) that carries a data stream, and a data stream is a sequence of digitally encoded data units (such as data packets containing data), which is used to transmit or receive information. As explained below, spatial diversity is performed to transmit data in accordance with the present teachings.

In the uplink direction (i.e., from a wireless device to the network infrastructure), for example, antenna 110 transmits data comprising the stream 114, which is intended for at least one of the antennas such as antenna 106, and antenna 112 transmits data comprising the stream 116, which is intended for at least one of the antennas such as antenna 108. In this example, the communication device 104 transmits data streams to the eNB 102, but in actual systems the eNB 102 also transmits data streams in the downlink direction to the communication device 104. In that alternative example, the antenna 106 transmits a data stream intended for antenna 110, and the antenna 108 transmits a data stream intended for antenna 112. Moreover, the streams 114, 116 are shown as being transmitted directly from antennas 110, 112 to antennas 106, 108. However, in actual systems, when transmissions occur in the uplink or downlink direction using spatial diversity, the receiving antennas also receive indirect components of the transmitted streams. Thus, in this particular example, in the uplink direction, each of the antennas 106, 108 might receive signals emanating from both antennas 110, 112. The eNB 102 would then be configured to reconstruct the transmitted data from the multiple received direct and indirect streams.

When a next generation system includes multiple antennas, the multiple antennas are used, in one example, to provide more reliable transmissions. This is done through spatial diversity. More particularly, the multiple antennas 110, 112 transmit a copy of the same data to the eNB 102. Because the eNB 102 has two copies of data to work with, the eNB 102 is able to correct any errors that have occurred during transmission. By correcting errors through the use of transmitting redundant information, systems using spatial diversity provide a more reliable link.

Turning now to FIG. 2, which shows a block diagram of an electronic device 200 that implements embodiments of the present teachings. In one embodiment, the electronic device 200 is a portable wireless communication device, such as the communication device 104. In another embodiment, the electronic device 200 comprises network or infrastructure equipment, such as the eNB 102. Accordingly, where the description refers to a "communication device 200", it should be realized that the description also applies to an infrastructure electronic device unless otherwise indicated. In accordance with the present teachings, electronic device 200 selectively transmits data using spatial diversity and includes: at least two transmitters, such as is included in transceivers 208, 210 (which also each includes a receiver); a controller 216; two or more radio antennas 202, 204; a filter and switch network 206; two or more power amplifiers 226, 228; and one or more sensors 230. Only a limited number of transmitters, amplifiers, and antenna elements are shown for the sake of simplicity. However, it should be realized that additional such components may be present in a commercial embodiment of the electronic device 200. As shown the baseband controller 216 is coupled to the transceivers 208 and 210 and to the sensors 230. The transceivers 208 and 210 are coupled to a filter and switch network 206 in a receive path. The transceivers 208 and 210 are also coupled to power amplifiers 226 and 228, respectively, in a transmit path. The antennas 202, 204 are coupled to the filter and switch network 206.

The controller 216, in one embodiment, comprises a baseband processor 216. In the following description, the terms "controller" and "baseband processor" are, thereby, used interchangeably. For example, baseband processor 216 is comprised of one or more integrated circuit chips having data processing hardware, a memory (e.g., random access memory (RAM)) and firmware or software used to configure, e.g., program, the baseband processor to perform a number of radio control functions that require an antenna element for data communications. The functions include, but are not limited to: encoding and decoding digital data; generating or parsing out certain control data such as acknowledges (ACKs), not-acknowledges (NACKs), channel quality indicators (CQIs), etc.; implementing timing advances; controlling power level measurements, sensor reading, and signal strength (e.g., RSSI, SNR) analysis; etc.

During a transmit operation, the baseband processor 216 receives data, for instance, audio (e.g., voice) data from a microphone, video data from a recording device, or other data from an application in the electronic device. The baseband processor 216 supplies a digital information signal containing the data (also referred herein as a data stream) to one or both of the transmitters within transceivers 208, 210. In an embodiment, each transmitter is configured to transmit signals within a particular frequency range (for instance in a certain frequency band). Accordingly, the processing device selects the one or more transmitters based on the frequency band within which the channel falls, which is used to transmit the data stream).

Upon receiving the data stream, the transmitter (e.g., within transceiver 208, 210) is configured to modulate the data stream onto a carrier signal. The power amplifier (226, 228) amplifies the modulated signal. The filter and switch network 206 is configured to filter unwanted frequency components from the amplified signal and provide the filtered signal to the correct antenna element(s), and may further including hardware for tuning the antenna elements to improve the efficiency of power transfer between the antenna element and the transmitter. The antenna element (202, 204) is an electric device that sends the filtered signal as a radio wave signal to an antenna element in a receiving device.

During a receive operation the reverse signal processing is performed, the antenna element (202, 204) receives (i.e., picks up) a signal having a data stream. The filter and switch network 206 removes unwanted frequency components from the signal. The receiver (included in the transceiver 208, 210) demodulates the signal, and the baseband controller 216 decodes the demodulated system to enable other components in the electronic device 200, for instance, to prepare the received data for storage and/or presentation to a user. The particular signal processing (e.g., the types of modulation/demodulation, encoding/decoding, control data generation, etc.,) depends at least in part on the particular wireless access technology used by the devices within the wireless network. Examples of wireless access technology implemented by the electronic device 200 include one or more of Global System for Mobile Communication (GSM), Coded Division Multiple Access (CDMA), LTE, to name a few.

The at least one sensor 230 is configured to communicate sensed data to the baseband processor 216. In one embodiment, sensed data includes information concerning the immediate environment in which the communication device 200 operates which affects signal quality. Examples of sensed data includes, but is not limited to, whether a user's hand is covering an antenna, or whether the user is holding the communication device 200 in such a way that antenna transmission capability is impaired. Such antenna impairment degrades the signal transmissions of communication device 200.

Figure 3:
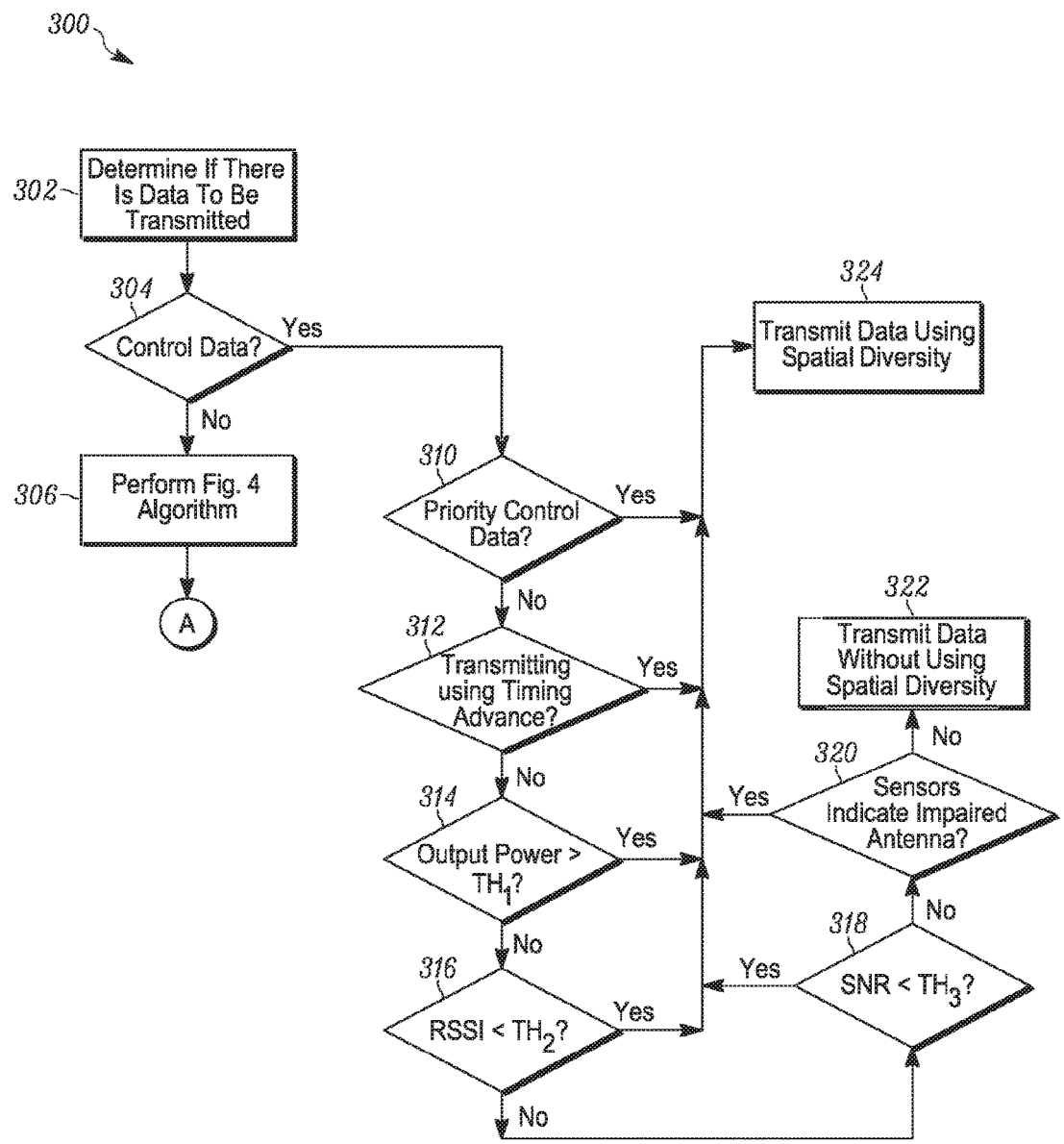
FIG. 3 is a logical flowchart illustrating a method for determining whether to transmit control data using diversity, in accordance with an embodiment.
Figure 4:
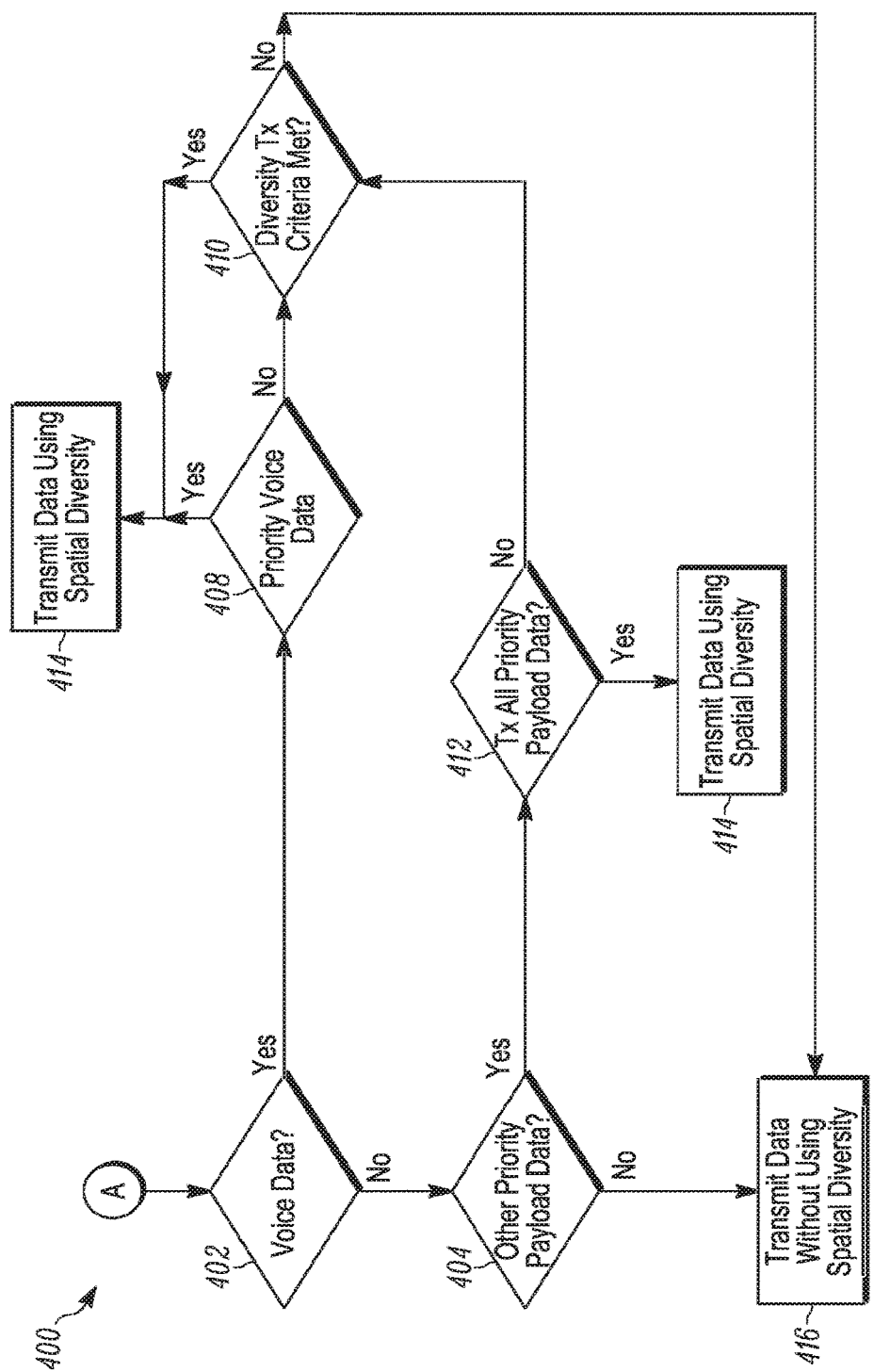
FIG. 4 is a logical flowchart illustrating a method for determining whether to transmit payload data using diversity, in accordance with an embodiment.
Figure 5:
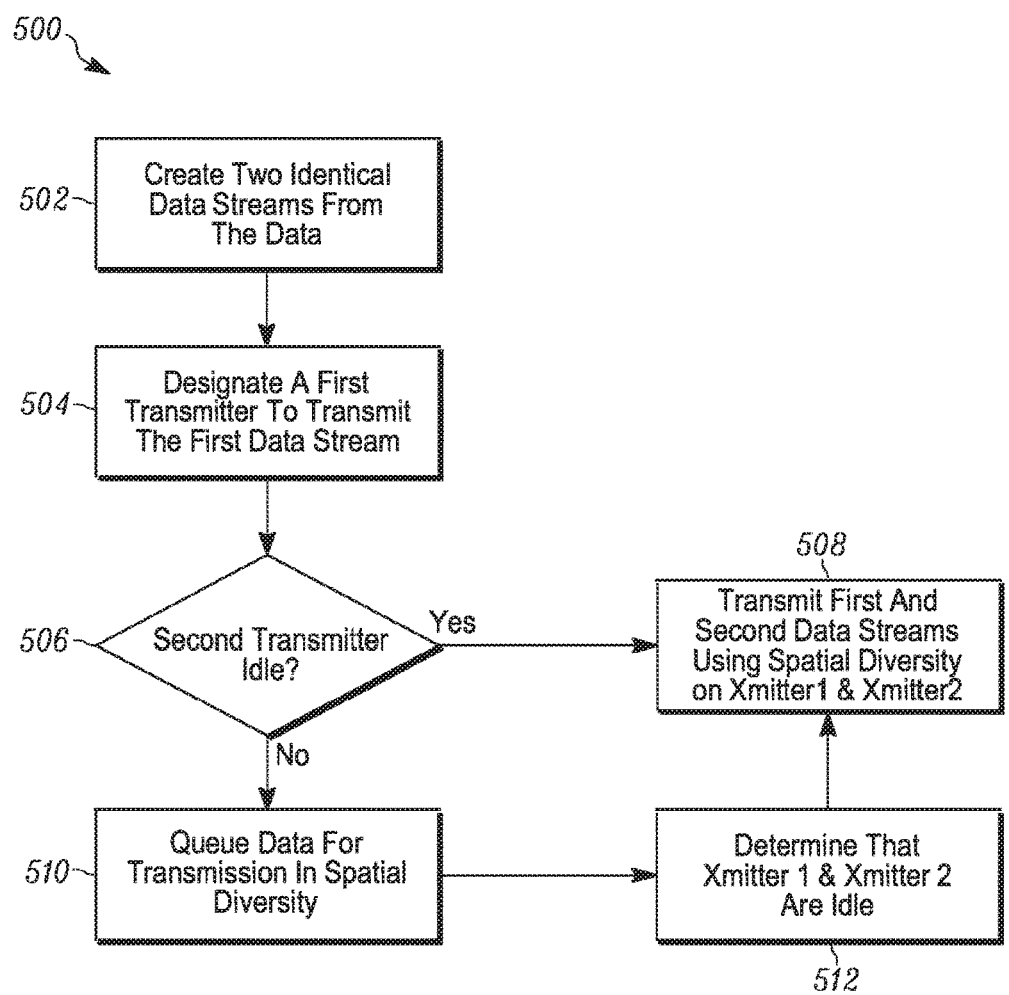
FIG. 5 is a logical flowchart illustrating a method for transmitting priority payload data and control data using diversity, in accordance with an embodiment.

We now turn to a detailed description of the functionality of the system 200 elements in accordance with teachings herein and by reference to the remaining figures. FIGS. 3-5 are logical flowcharts illustrating methods performed in an electronic device, such as the electronic device 200, for selectively transmitting data using spatial diversity. "Selectively" transmitting using spatial diversity means that the electronic device transmits using spatial diversity upon determining that one or more criteria are met, for example as described below with respect to the remaining FIGS. 3-5. In an embodiment, at least some of the functionality illustrated by reference to FIGS. 3-5 is performed by the baseband processor 216 as described in detail below.

Turning now to method 300 illustrated in FIG. 3, at 302, the baseband processor 216 determines that there is data to be transmitted over the air to the eNB 102. Using the remainder of method 300, the baseband processor 216 determines the type of the data and determines whether the data type meets a data type or other criteria for transmission using spatial diversity. More particularly, in accordance with the present teachings, only certain data including "priority data" (such as certain types of control data or certain types of payload data) or data that meets a diversity transmit criteria are transmitted using spatial diversity, in order to preserve battery life and network resources. Priority data means certain types of data as designated in some manner in or by the communication device 200 as having a higher importance or priority level over other types of data. In an embodiment, the controller is configured to determine that the data meets the data type criteria when the data comprises one of: priority control data (such as an ACK, NACK or CQI data type); or priority payload data such as voice.

Generally, there are two types of data that are transmitted within messaging (also known as messages, packets, datagrams, frames, superframes, and the like) between the communication device 104 and the eNB 102. These two types of data (i.e., data types) are control data and payload data. As used herein, the term control data refers to information sent between devices within a network to control aspects of a communication session such as session establishment, maintenance, or tear down, status of channels over which messages are transported, status of messages sent between the devices, etc. A communication session is a logical representation of a group of communication exchanges, e.g., messaging, between multiple devices. The term payload data refers to media sent between multiple devices, wherein media includes, but is not limited to, voice, video, text, etc. Messages that contain control data are referred to herein as control messages; and messages that contain payload data are referred to herein as payload messages. Control message types include automatic repeat request (ARQ), ACK, NACK, precoding matrix indicator (PMI), rank indicator (RI), CQI, as well as other types. Control messages also include, in one example, overhead messages.

In one illustrative implementation, control data is used for administering various aspects of a communication session between the communication device 104 and the eNB 102. Because control messages are used for administering a communication session, if a sender of a payload message does not receive a proper control message response, the sender, in one example, retransmits the payload message. For instance, if the eNB 102 sends a payload message and mistranslates a responsive ACK message as a NACK because of a poor original transmission, the eNB 102 will resend the originally transmitted payload. When the eNB 102 has to unnecessarily retransmit payload, valuable wireless resources and valuable battery resources in the communication device 104 are unnecessarily used because of the poor transmission of the responding control message. For this reason, among others, it is advantageous to communicate some messages in general including specific control messages types such as ACKs, NACKs and CQI control messages or specific payload messages, using spatial diversity.

Returning to FIG. 3, upon determining if there is data to be transmitted at 302, the baseband processor 216 determines, using method 300: whether the type of data meets a data type criteria, comprising determining whether the data includes priority control data; or whether the data meets some other criteria, for diversity transmission. A data type criteria means a criteria that identifies a particular type of data that is transmitted using spatial diversity, such as priority data, e.g., priority control data or priority payload data. In an embodiment, determining, at 304, whether the data includes priority data comprises first determining whether the data includes control data. For instance, in one implementation scenario, the baseband processor 216 includes a protocol stack that generates control message types that supports wireless communication within an LTE or WiMax network. Such control message types include, but are not limited to ACKs, NACKs, CQIs, hybrid automatic repeat requests (HARQ), etc. As such, the baseband processor 216 knows that control data is being transmitted and also knows the type of control data being transmitted and proceeds to function block 310 of method 300.

Alternatively, the baseband processor 216 determines that the data to be transmitted is payload data. Accordingly, the electronic device, at 306, performs the algorithm of FIG. 4 to determine whether the payload data meets a data type or other criteria that would allow transmission using spatial diversity. For example, the baseband processor 216 receives digital data from an application in the electronic device, such as a video data from a video or camera application within the electronic device 200, and determines that this is payload data. In another implementation scenario, the baseband processor receives analog data such as voice data from a microphone within the electronic device 200 and, thus, determines that this is payload data.

In an embodiment, only certain control message types meet the data type or other criteria, and the electronic device 200 transmits only some control data using spatial diversity. For example, the electronic device transmits only particular types of control data termed herein as "priority" control data using spatial diversity. In this embodiment, the data is transmitted using spatial diversity (at 324) when the data includes priority control data. Accordingly, determining whether the type of data meets the data type criteria (for transmitting using spatial diversity at 324) further comprises determining (at 310) whether the data includes priority data, which comprises determining whether the data includes priority control data, wherein the priority control data is transmitted using spatial diversity. The baseband processor 216 is programmed, e.g., by a system administrator, to know which control data is priority control data. In an embodiment, priority control data comprises one of an acknowledge message, a not-acknowledge message or a channel quality indicator message type. Other control messages such as requests for information or non-critical status reports are, in one example, not designated as priority control data.

In a further embodiment, when the control data is not priority control data, the baseband processor 216 uses additional criteria (termed herein as "diversity transmit criteria") to determine whether to transmit the control data using spatial diversity. Diversity transmit criteria is any criteria, other than the type of data, that an electronic device considers in determining whether to transmit data using spatial diversity. In accordance with this embodiment, the baseband processor 216 determines (e.g., using functions 312-320, which will be described in further detail below) whether a diversity transmit criteria is met, and transmits the control data, at 324, using spatial diversity when one or more diversity transmit criteria is met (as determined by the particular algorithm implemented in the communication device 200) and when the type of data meets a data type criteria (which in this case is being control data but may also be, for instance, certain payload data such as priority payload data). Determining whether the diversity transmit criteria is met, in one example, comprises at least one of determining whether the communication device is implementing a timing advance when transmitting; determining whether output power at the communication device exceeds a first threshold; determining whether a sensor indicates an impaired antenna element in the communication device; determining whether an RSSI value is less than a second threshold; or determining whether an SNR value is less than a third threshold. The eNB 102, in another example, sends a message to the communication device 200 with instructions on which messages should be sent using spatial diversity.

More particularly, at 312, the baseband controller determines whether the electronic device is transmitting using a timing advance. The communication device 200 transmits using a timing advance when the eNB 102 has determined that the communication device 200 needs to advance its timing. Transmissions between a communication device, such as communication device 200, and a base station, such as the eNB 102, are typically synchronized. The eNB 102 determines based on this timing where, for example, a particular time slot or frame begins and ends. The communication device 200 times its transmissions so that particular data falls within an assigned time frame.

When, however, the communication device 200 is a long distance from the eNB 102, it takes a longer time for a signal to travel from the communication device 200 to the eNB 102. This longer travel time skews the synchronization between the communication device 200 and the eNB 102. Thus, the eNB 102 commands or instructs the communication device 200 to advance its timing (transmit using a timing advance) to overcome the signal travel time delay. Thus, when the communication device 200 is using a timing advance, this indicates that the communication device is a relatively long distance from the eNB 102, which indicates that the signal between the eNB 102 and the communication device 200 is less robust. Therefore, the need for implementing a timing advance in the communication device 200 serves as a proxy for signal quality.

In other words, when the eNB 102 requests that the communication device 200 advance its timing, this indicates that the signal quality between the communication device 200 and the eNB 102 is probably declining and a control message transmitted under these circumstances is more likely to be dropped. In these circumstances when the communication device 200 transmits data redundantly using spatial diversity, the recipient is more likely to successfully recreate the transmitted data. Accordingly, when the baseband processor determines that the communication device 200 is transmitting using a timing advance, the control data is transmitted using spatial diversity, at 324. Otherwise, the method 300 moves to block 314.

At 314 the baseband processor 216 determines whether the output power of the communication device 200 is above a first threshold. The communication device 200, in one example, determines its output power. In another example, the communication device 200 receives parameters from the eNB 102 which indicate what the output power of the communication device 200 should be. Regardless of how the output power is determined, if the output power of the communication device 200 exceeds the first threshold, this indicates that the communication device 200 has increased its output power to maintain a stable communication session with the eNB 102. In one example, the communication device 200 increases its output power because its signal is fading. Accordingly, when at 314 the baseband processor 216 determines that the output power of the communication device 200 is above the first threshold this indicates, in one example, that the signal quality between the communication device 200 and the eNB 102 is poor. Thus, at 324, the baseband processor 216 transmits the control data using spatial diversity in order to ensure that the eNB 102 receives the control data.

When, at 314, the baseband processor 216 determines that the output power of the communication device 200 is not above the first threshold, at 316 the baseband processor 216 determines whether the RSSI of the communication device 200 is below a second threshold. RSSI is a measure of received signal strength in a wireless environment in IEEE 802.11 systems, for example, and can be measured using hardware in a receiver. When the RSSI of the communication device 200 drops below the second threshold, this indicates that the signal between the communication device 200 and the eNB 102 is weak. Because the signal is weak, it is more likely that control data may be lost in transmission. Thus, it would be advantageous to redundantly transmit control data using spatial diversity when the RSSI is below the second threshold. Accordingly, at 324 the baseband processor 216 transmits the data using spatial diversity.

When, at 316, the baseband processor 216 determines that the RSSI of the communication device 200 is not below the second threshold, at 318 the baseband processor 216 determines if the SNR is lower than a third threshold. SNR is used to compare the level of a desired signal to the level of background noise and is defined, in one example implementation, as the ratio of signal power to noise power. When, at 318, the baseband processor 216 determines that the SNR of the communication device 200 is less than the third threshold this indicates, in one example, that the signal between the communication device 200 and the eNB 102 is experiencing an inordinate amount of interference. Thus, it would be advantageous to redundantly transmit the data using spatial diversity. Accordingly, at 324, the baseband processor 216 transmits the data using spatial diversity 324.

As mentioned above, the baseband processor 216 communicates with sensors 230 located in various locations of the communication device 200. The sensors 230 communicate data to the baseband processor 216, which includes information concerning the immediate environment in which the communication device 200 is operating that affects signal quality. This information includes, but is not limited to, whether a user's hand is covering an antenna or that the user is holding the communication device 200 in such a way that antenna transmission capability is impaired or blocked. This antenna impairment degrades the signal transmissions of the communication device 200 and increases the likelihood that data will not be successfully transmitted. Thus, it is advantageous to transmit the data using spatial diversity when the sensors 230 indicate an antenna is impaired. Accordingly, at 320, when the baseband processor 216 determines that the sensors 230 indicate that an antenna is impaired, at 324 the baseband processor 216 transmits the data using spatial diversity at 324. If none of the data type or transmit diversity criteria are met or the correct combination of diversity transmit criteria is not met (depending on the algorithm), the baseband processor 216, at 322, transmits the data without using spatial diversity.

As previously explained, because transmitting in diversity requires transmitting data using more than one antenna, transmitting data using diversity typically consumes more battery power than transmitting without using diversity. Accordingly, in other embodiments, the baseband processor 216 determines whether to transmit using diversity based on the same diversity transmit criteria shown in the flow diagram 300, but the baseband processor 216 makes the determination in a different manner. For example, in one embodiment the baseband processor 216 determines the output power level, the RSSI and the SNR of the communication device 200 and combines these values into one aggregate value and compares the aggregate value against a single threshold instead of three different thresholds. The baseband processor 216 transmits data using spatial diversity depending on the result of this comparison.

In another embodiment, the SNR and the RSSI level of the communication device 200 are combined into an aggregate value and compared against a first alternate threshold, and the output power is compared against a second alternate threshold. If the aggregate value of the SNR and RSSI level is below the first alternate threshold, and/or the output power is above the second alternate threshold, the communication device 200 transmits using spatial diversity. In another embodiment, the output power, RSSI and SNR is combined in various ways and compared against various thresholds. The communication device 200 transmits using spatial diversity based on these comparisons. In still other embodiments, the various threshold values are raised or lowered, which would affect whether or not the communication device 200 would be more likely to transmit using spatial diversity. Moreover, FIG. 3 illustrates one example order in which the baseband processor considers diversity transmit criteria. However, such consideration is not limited to this specific order. Moreover, simultaneous consideration of multiple of the above diversity transmit criteria and/or consideration of diversity transmit criteria not specifically mentioned is not precluded from the scope of the present teachings.

Turning back to 304, when the baseband processor 216 determines that the data to be transmitted is not control data, at 306 the baseband processor 216 performs the method 400 of FIG. 4. FIG. 4 illustrates a logical flowchart of a method 400 for determining whether to transmit payload data using spatial diversity. In one embodiment, the method 400 executes on the baseband processor 216. In accordance with the present teachings, determining whether the data includes priority data comprises determining whether the data includes priority payload data, wherein only the priority payload data is transmitted using spatial diversity. Priority payload data means only certain types of payload data as designated in some manner in or by the communication device 200. As with priority control data, the baseband processor 216 is programmed in one embodiment, e.g., by a system administrator, to know which payload data is priority payload data.

In one example, the priority payload data includes priority voice data. Accordingly, at 402, the baseband processor 216 determines whether the payload data is voice data. When the payload data is voice data, at 408 the baseband processor 216 determines if the voice data is priority voice data. In one example, priority voice data is voice data requiring a higher QoS than regular voice data, or the priority voice data is associated with an emergency call that must have a clear voice channel. When the voice data is priority voice data, at 414 the baseband processor 216 transmits the data using spatial diversity. One example of priority voice data includes examining the first syllables of a transmission. For example, when public safety officers are responding over the air with "SHOOT" or "DON'T SHOOT", the transmission of the first syllables are critical. Therefore, the communication device 200 transmits, in one example, the beginning of a voice data stream with spatial diversity including critical syllables, and then transmits without diversity after a threshold of, for example, two seconds.

When, at 408, the baseband processor 216 determines that the voice data is not priority voice data, at 410 the baseband processor 216 determines whether certain diversity transmit criteria are met. If one or more diversity transmit criteria are met, as determined by the algorithm that the communication device 200 performs at block 410, the communication device 200 transmits the data using spatial diversity, at 414. Otherwise, the communication device 200 transmits the data without using spatial diversity, at 416. In one embodiment, determining whether diversity transmit criteria are met includes determining whether: the communication device 200 is transmitting using a timing advance, the output power level of the communication device 200 is above a first threshold, the RSSI level of the communication device 200 is below a second threshold, the SNR level of the communication 200 is below a third threshold, or sensors 230 indicate an antenna is impaired. When any of these or other diversity transmit criteria are met, at 414 the baseband processor 216 transmits the voice data using spatial diversity.

In other embodiments, the determination of whether the diversity transmit criteria is met is performed in a different order. In still other examples, the baseband processor 216 determines whether to transmit using spatial diversity based on the same criteria, but the determination is made in a different manner. For example, different diversity transmit criteria or different aggregates of the diversity transmit criteria are compared against one or more thresholds to determine whether or not to transmit using spatial diversity. Also, values of the thresholds are raised or lowered, in different embodiments, to affect when transmission using spatial diversity occurs.

When, at 402, the baseband processor 216 determines that the payload data is not voice data, at 404 the baseband processor 216 determines whether the payload data is other priority payload data. For example, some priority payload data is of greater importance or more significant than other payload data and should, therefore, be sent on a more reliable data stream. Priority payload data includes, for example, data tagged as part of an emergency message, messages from certain users, such as, public service officials, or data from an active crime scene. Because priority payload data includes messages that should be reliably delivered, in one example, priority payload data may be transmitted using spatial diversity to further increase the likelihood that the priority payload data is delivered.

When, at 404, the baseband processor 216 determines that the payload data is other priority payload data, the baseband processor 216 at 412 determines if all priority payload data should be transmitted using spatial diversity. When, at 412, the baseband processor 216 determines that all priority payload should be transmitted using spatial diversity, at 414 the baseband processor 216 transmits the priority payload data using spatial diversity. When, at 412, the baseband processor 216 determines that not all priority payload data should be transmitted using spatial diversity, the baseband processor 216 performs 410 to determine whether diversity transmit criteria are met. If one or more diversity transmit criteria are met, as determined by the algorithm that the communication device 200 performs at block 410, the communication device 200 transmits the data using spatial diversity, at 414. Otherwise, the communication device 200 transmits the data without using spatial diversity, at 416.

FIG. 5 shows one example of a logical flow chart illustrating a method 500 of transmitting priority payload data or control data using spatial diversity. When a next generation system includes multiple antennas, the multiple antennas are used, in one example, to provide more reliable transmissions. This is done through spatial diversity. More particularly, two or more antennas transmit a copy of the same data. In an embodiment, transmitting data using spatial diversity includes transmitting the data using at least two of multiple transmitters, for example, the transceivers 208, 210 of the communication device 200. In one embodiment, transmitting data using at least two of the multiple transmitters comprises: creating identical first and second streams of the data; designating a first transmitter to transmit the first stream of a channel; and determining when a second transmitter is idle to transmit the second stream over the same channel; and transmitting the first and second streams of the data using the first transmitter and the second transmitter when the second transmitter is idle.

Returning to FIG. 5, in one example, the method 500 is executed on the baseband processor 216. Upon invocation, the communication device 200 has determined, for instance using the algorithms represented in FIG. 3 or FIG. 4 (at blocks 324 and 414 respectively), that the data should be transmitted using spatial diversity. In an embodiment, transmitting the data using at least two transmitters comprises creating identical first and second streams of the data (at 502). Further, at 504, in one example, the baseband processor 216 designates the first transmitter to transmit the first steam on a channel on which, for example, the two transmitters are configured to transmit data.

At 506, the baseband processor 216 determines if the second transmitter is idle to transmit the data over the channel. An idle transmitter, in one example, is a transmitter that is not currently transmitting data, and an active transmitter is a transmitter that is currently transmitting data. The baseband processor 216 transmits the first and second streams of the data using the first transmitter and the second transmitter (at 508) when the baseband processor 216 determines that the second transmitter is idle (at 506). When the baseband processor 216 determines at 506 that the second transmitter is active, the baseband processor 216 requests an uplink schedule grant. An uplink schedule grant, in one embodiment, is a way for the baseband processor 216 to queue the data for transmission in spatial diversity (at 510) using both transmitters at a later time. Thus, when the baseband processor 216 determines that the first and second transmitter are idle (at 512), the baseband processor 216 transmits the first and second streams of the data using the first transmitter and the second transmitter (at 508). The eNB 102 receives the first and second streams and reconstructs the original single stream from the first and second streams. Because the eNB 102 has two copies of the original stream to work with, the eNB 102 is able to correct any errors that have occurred during transmission. By correcting errors through the use of transmitting redundant information, systems using spatial diversity provide a more reliable link.

By implementing embodiments disclosed by these teachings, significant benefits are realized over the current state-of-the-art in that data meeting a certain data type criteria are transmitted using spatial diversity. In one embodiment, these criteria include whether the data is control data or priority payload data. Further determinations are made to further distinguish the type of data to be transmitted, and the conditions under which the data is transmitted. Thus, in accordance with the present teachings, data is transmitted using diversity when these criteria are met and, in some examples, when conditions dictate that the data should be transmitted, such as by considering one or more diversity transmit criteria, alone or in combination. Accordingly, the extra battery power consumed to transmit data using spatial diversity is only used when the data type, and in some examples, the transmission conditions indicate that the data should be transmitted using spatial diversity.

Those skilled in the art, however, will recognize and appreciate that the specifics of this example are merely illustrative of some embodiments and that the teachings set forth herein are applicable in a variety of alternative settings. For example, since the teachings described do not depend on the method being executed only in the baseband processor 216, they can be applied to any type of controller, baseband processor, or integrated circuit of a wireless device although a baseband processor disposed in a wireless device or infrastructure device, such as is shown in the disclosed embodiments. As such, other alternative implementations of using different types of controllers and wireless devices are contemplated and are within the scope of the various teachings described.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but includes other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but is also configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for selectively transmitting data using spatial diversity, the method comprising:
   determining, by a controller of a portable communication device having multiple transmitters, that data is to be transmitted to a base station device using one or more of the multiple transmitters;
   identifying, based on a priority level criterium and by the controller of the portable communication device, a first portion of the data as priority data;
   identifying, based on the priority level criterium and by the controller of the portable communication device, a second portion of the data as non-priority data;
   transmitting, based on the identifying the second portion of the data as non-priority data and by the portable communication device, the second portion of data to the base station device without using spatial diversity via one of the multiple transmitters of the portable communication device; and
   transmitting, based on the identifying the first portion of the data as priority data and by the portable communication device, the first portion of the data to the base station using spatial diversity, the first portion of the data transmitted using spatial diversity by:
   creating, based on the first portion of the data, identical first and second data streams;
   designating a first transmitter of the multiple transmitters by which to transmit the first data stream over a channel;
   determining whether a second transmitter of the multiple transmitters is idle to facilitate transmission of the second data stream over the channel;
   requesting, if the second transmitter of the multiple transmitters is not idle, an uplink schedule grant effective to queue the second data stream for subsequent transmission by the second transmitter;
   activating, when the second transmitter is idle, the second transmitter to enable transmission over the channel; and
   transmitting the first and second data streams of the first portion of the data using the first transmitter and the second transmitter, respectively.

2. The method of claim 1, wherein:
   the data comprises a voice data stream,
   the first portion of the data is identified as priority voice data, and
   the second portion of the data is identified as non-priority voice data.

3. The method of claim 2, wherein the identification of the first and second portions of the data is based on a time threshold from a start of the voice data stream.

4. The method of claim 1 further comprising transmitting, responsive to determining that a diversity transmit criterium has been met, other non-priority data using spatial diversity via at least two of the transmitters.

5. The method of claim 4, wherein the diversity transmit criterium comprise a determination as to whether:
   the portable communicator device is implementing a timing advance to transmit;
   an output power level of a transmitter of the transmitters exceeds a power level threshold;
   an antenna element of the portable communication device is impaired;
   a received signal strength indicator value is less than a signal strength threshold; or
   a signal to noise ratio is less than a signal to noise threshold.

6. The method of claim 5, wherein the diversity transmit criterium comprise a determination as to whether an aggregate value based on a combination of the received strength indicator value and the signal to noise ratio is less than a threshold for the aggregate value.

7. The method of claim 1, wherein identifying of the first portion of the data as priority data comprises identifying the first portion of the data as priority control data.

8. An electronic device that selectively transmits data using spatial diversity, the electronic device comprising:
   at least two transmitters; and
   a controller configured to:
   determine that data of the electronic device is to be transmitted;
   identify a first portion of the data as priority data based on a priority level criterium;
   identify a second portion of the data as non-priority data based on the priority level criterium;
   transmit, responsive to identifying the second portion of the data as non-priority data, the second portion of the data without using spatial diversity via one of the transmitters; and
   transmit, responsive to identifying the first portion of the data as priority data, the first portion of the data using spatial diversity via at least two of the transmitters, wherein to transmit the first portion of the data using spatial diversity, the controller is further configured to:
   create, based on the first portion of the data, identical first and second streams of the first portion of the data;
   designate a first transmitter of the at least two transmitters by which to transmit the first stream over a channel;
   determine whether a second transmitter of the at least two transmitters is idle to facilitate transmission of the second stream over the channel;
   request, if the second transmitter of the at least two transmitters is not idle, an uplink schedule grant effective to queue the second data stream for subsequent transmission by the second transmitter;
   responsive to determining that the second transmitter is idle, activate the second transmitter to enable transmission over the channel, and
   transmit the first and second streams of the first portion of the data via the first and second transmitters.

9. The electronic device of claim 8, wherein:
   the data comprises a voice data stream,
   the first portion of the data is identified as priority voice data, and
   the second portion of the data is identified as non-priority voice data.

10. The electronic device of claim 9, wherein the identification of the first and second portions of the data is based on a time threshold from a start of the voice data stream.

11. The electronic device of claim 8, wherein the controller is further configured to determine whether a diversity transmit criterium is met; and the transmitters are further configured to transmit other non-priority data using spatial diversity.

12. The electronic device of claim 11, wherein the diversity transmit criterium comprise a determination of whether:
the electronic device is implementing a timing advance to transmit;
an output power level of the one or more transmitters exceeds a power level threshold;
a sensor indicates impairment of an antenna element of the electronic device;
a received signal strength indicator value is less than a signal strength threshold; or
a signal to noise ratio value is less than a noise threshold.

13. The electronic device of claim 8, wherein the identification of the first portion of the data as priority data comprises identifying the first portion of the data as priority control data.

14. A hardware-based computer-readable memory device storing processor-executable code that, responsive to execution by a controller of a portable communication device, causes the controller to implement operations for selectively transmitting data using spatial diversity, the operations comprising:
determining that data is to be transmitted using at least one of multiple transmitters of the portable communication device;
identifying, based on a priority level criterium, a first portion of the data as priority data;
identifying, based on the priority level criterium, a second portion of the data as non-priority data;
transmitting, responsive to identifying the second portion of the data as non-priority data, the second portion of the data without using spatial diversity via one of the multiple transmitters of the portable communication device; and
transmitting the first portion of the data via at least two of the multiple transmitters using spatial diversity responsive to identifying the first portion of the data as priority data, the first portion of the data transmitted using spatial diversity by:
creating, based on the first portion of the data, identical first and second streams of the first portion of the data;
designating a first transmitter of the multiple transmitters by which to transmit the first data stream over a channel;
determining whether a second transmitter of the multiple transmitters is idle to facilitate transmission of the second data stream over the channel;
requesting, if the second transmitter of the multiple transmitters is not idle, an uplink schedule grant effective to queue the second data stream for subsequent transmission by the second transmitter;
activating, in response to determining that the second transmitter is idle, the second transmitter to enable transmission over the channel; and
transmitting the first and second data streams of the first portion of the data using the first transmitter and the second transmitter, respectively.

15. The hardware-based computer-readable memory device of claim 14, wherein:
the data comprises a voice data stream,
the first portion of the data comprises priority voice data, and
the second portion of the data is comprises non-priority voice data.

16. The hardware-based computer-readable memory device of claim 15, wherein the identification of the first and second portions of the data is based on a time threshold from a start of the voice data stream.

17. The hardware-based computer-readable memory device of claim 14, wherein the operations further comprise:
responsive to determining that a diversity transmit criterium is met, transmitting other non-priority data using spatial diversity via at least two of the transmitters.

18. The hardware-based computer-readable memory device of claim 17, wherein the diversity transmit criterium comprise a determination as to whether:
the portable communication device is implementing a timing advance to transmit;
an output power level of the one or more transmitters exceeds a power level threshold;
a sensor indicates impairment of an antenna element of the portable communication device;
a received signal strength indicator value is less than a signal strength threshold; or
a signal to noise ratio value is less than a signal to noise threshold.

19. The hardware-based computer-readable memory device of claim 18, wherein the diversity transmit criterium comprise a determination as to whether an aggregate value based on a combination of the received strength indicator value and the signal to noise ratio is less than a threshold for the aggregate value.

20. The hardware-based computer-readable memory device of claim 14, wherein identifying the first portion of the data as priority data comprises identifying the first portion of the data as priority control data.

* * * * *